United States Patent
Landis et al.

(10) Patent No.: US 11,800,465 B2
(45) Date of Patent: Oct. 24, 2023

(54) RADIO DYNAMIC SYNCHRONIZATION SIGNAL BLOCK ALLOCATION

(71) Applicant: QUALCOMM Incorporated, San Diego, CA (US)

(72) Inventors: Shay Landis, Hod Hasharon (IL); Ran Berliner, Kfar-Aviv (IL); Yehonatan Dallal, Kfar Saba (IL)

(73) Assignee: QUALCOMM Incorporated, San Diego, CA (US)

( * ) Notice: Subject to any disclaimer, the term of this patent is extended or adjusted under 35 U.S.C. 154(b) by 269 days.

(21) Appl. No.: 17/146,332

(22) Filed: Jan. 11, 2021

(65) Prior Publication Data
US 2022/0225248 A1    Jul. 14, 2022

(51) Int. Cl.
| | | |
|---|---|---|
| *H04W 56/00* | (2009.01) | |
| *H04B 17/318* | (2015.01) | |
| *H04B 7/06* | (2006.01) | |
| *H04W 24/10* | (2009.01) | |

(52) U.S. Cl.
CPC ........ *H04W 56/001* (2013.01); *H04B 7/0695* (2013.01); *H04B 17/318* (2015.01); *H04W 24/10* (2013.01)

(58) Field of Classification Search
CPC ... H04L 5/0048; H04L 5/0053; H04L 5/0023; H04L 5/0094; H04L 5/001; H04L 5/0091; H04L 5/0044; H04W 72/042; H04W 72/046; H04W 72/0446; H04W 24/10; H04W 16/28; H04W 72/1289; H04W 72/0453; H04W 56/001; H04W 74/0833; H04W 72/04; H04W 72/1273; H04W 72/0493
See application file for complete search history.

(56) References Cited

U.S. PATENT DOCUMENTS

| | | |
|---|---|---|
| 2020/0245157 A1 | 7/2020 | Chande et al. |
| 2020/0314673 A1 | 10/2020 | Deogun et al. |
| 2020/0413356 A1* | 12/2020 | Wang .................. H04W 56/001 |

FOREIGN PATENT DOCUMENTS

WO    2020164711 A1    8/2020

OTHER PUBLICATIONS

International Search Report and Written Opinion—PCT/US2021/063061—ISA/EPO—dated Feb. 22, 2022.

* cited by examiner

*Primary Examiner* — Khalid W Shaheed
(74) *Attorney, Agent, or Firm* — Loza & Loza LLP/QUALCOMM Incorporated

(57) ABSTRACT

Aspects of disclosure relate to dynamically modifying a synchronization signal block (SSB) beam configuration in a wireless communication system. In an aspect, a UE receives, from a base station, a first message triggering the UE to measure a signal strength of SSB beams transmitted from the base station. The UE then sends, to the base station, a second message including a report of the signal strength of the SSB beams and receives, from the base station, a third message indicating at least an SSB beam of the SSB beams or a quasi-colocation (QCL) type to use based on the report. The UE then establishes a connection with the base station using an indicated SSB beam or QCL type.

40 Claims, 11 Drawing Sheets

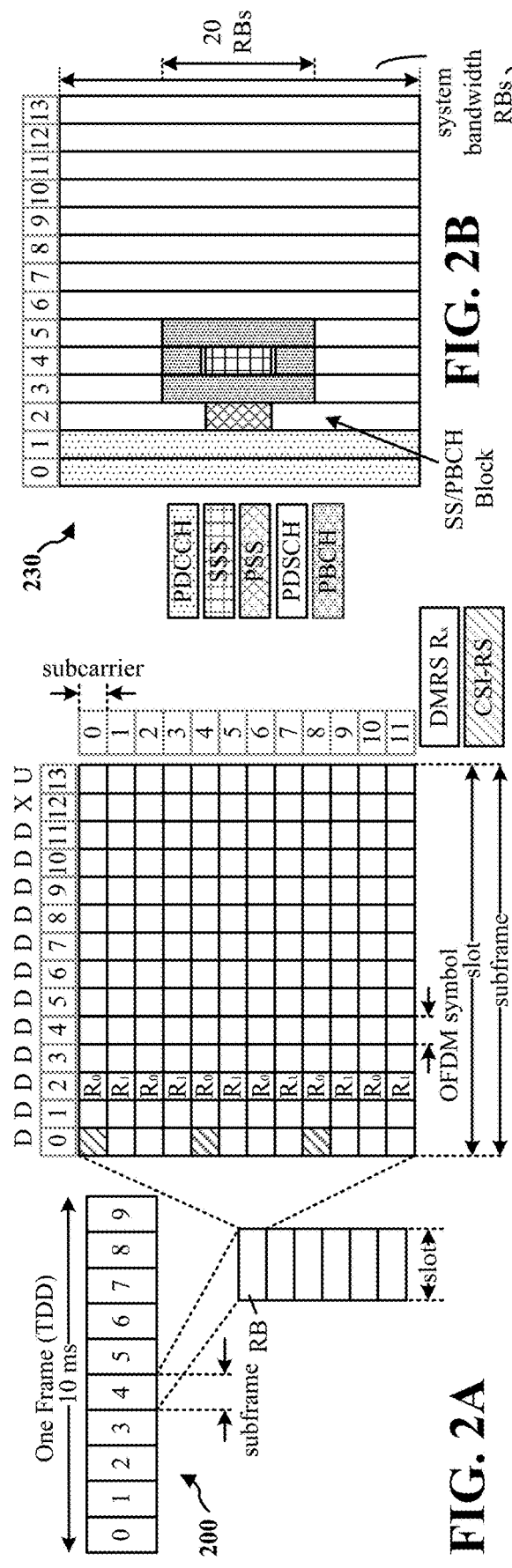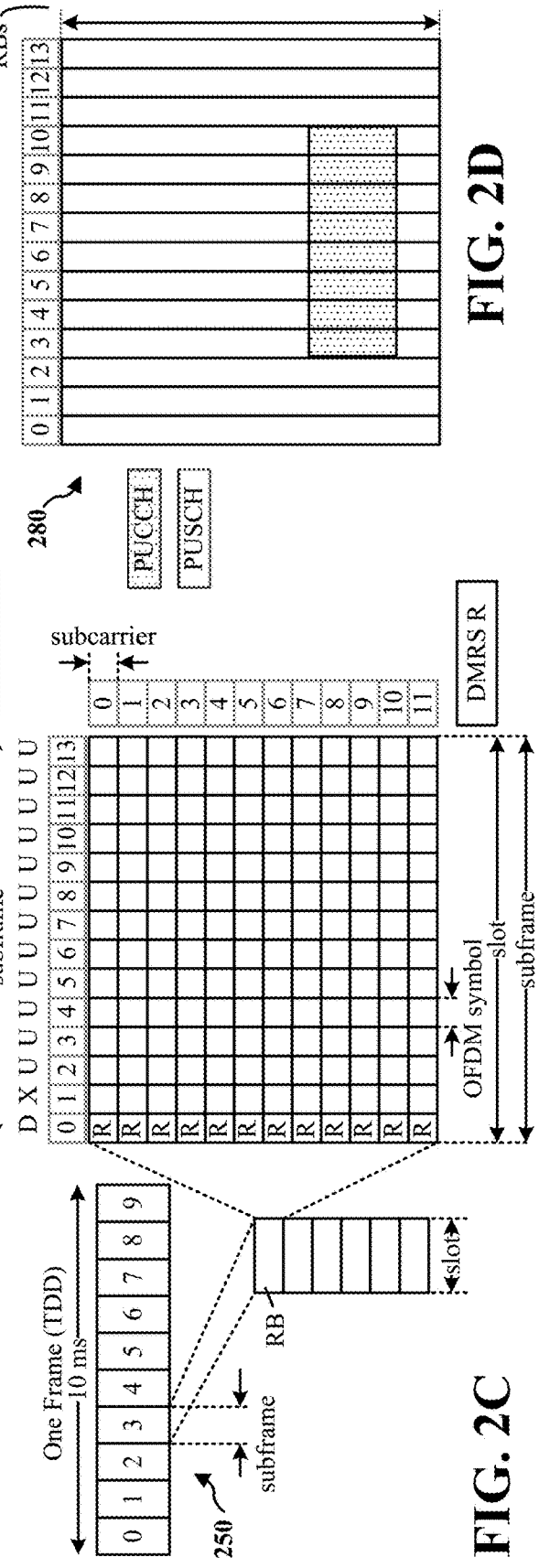
FIG. 2A
FIG. 2B
FIG. 2C
FIG. 2D

RADIO DYNAMIC SYNCHRONIZATION SIGNAL BLOCK ALLOCATION

INTRODUCTION

The present disclosure relates generally to communication systems, and more particularly, to supporting synchronization signal block (SSB) beam configurations.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example telecommunication is 5G new radio (NR). 5G NR is part of a continuous mobile broadband evolution promulgated by Third Generation Partnership Project (3GPP) to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation. As the demand for mobile broadband access continues to increase, there exists a need for further improvements in 5G NR technology. Preferably, these improvements should be applicable to other multi-access technologies and the telecommunication standards that employ these technologies.

SUMMARY

The following presents a summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a form as a prelude to the more detailed description that is presented later.

Aspects of the disclosure provide for a method, an apparatus, and a computer-readable medium for supporting dynamic modification of synchronization signal block (SSB) beam configurations. In one example, a method of dynamically modifying a synchronization signal block (SSB) beam configuration at a base station is disclosed. The method includes determining to modify an SSB beam configuration, sending, to a user equipment (UE) based on a determination to modify the SSB beam configuration, a first message triggering the UE to measure a signal strength of SSB beams transmitted from the base station, receiving, from the UE, a second message including a report of the signal strength of the SSB beams, sending, to the UE, a third message indicating at least an SSB beam of the SSB beams or a quasi-colocation (QCL) type to use based on the report, and establishing a connection with the UE using an indicated SSB beam or QCL type.

In another example, a base station for dynamically modifying a synchronization signal block (SSB) beam configuration is disclosed. The base station includes at least one processor and a memory coupled to the at least one processor. The at least one processor and the memory are configured to determine to modify an SSB beam configuration, send, to a user equipment (UE) based on a determination to modify the SSB beam configuration, a first message triggering the UE to measure a signal strength of SSB beams transmitted from the base station, receive, from the UE, a second message including a report of the signal strength of the SSB beams, send, to the UE, a third message indicating at least an SSB beam of the SSB beams or a quasi-colocation (QCL) type to use based on the report, and establish a connection with the UE using an indicated SSB beam or QCL type.

In a further example, a base station for dynamically modifying a synchronization signal block (SSB) beam configuration is disclosed. The base station includes means for determining to modify an SSB beam configuration, means for sending, to a user equipment (UE) based on a determination to modify the SSB beam configuration, a first message triggering the UE to measure a signal strength of SSB beams transmitted from the base station, means for receiving, from the UE, a second message including a report of the signal strength of the SSB beams, means for sending, to the UE, a third message indicating at least an SSB beam of the SSB beams or a quasi-colocation (QCL) type to use based on the report, and means for establishing a connection with the UE using an indicated SSB beam or QCL type.

In another example, a non-transitory computer-readable medium storing code at a base station is disclosed. The code includes instructions executable by a processor to determine to modify an SSB beam configuration, send, to a user equipment (UE) based on a determination to modify the SSB beam configuration, a first message triggering the UE to measure a signal strength of SSB beams transmitted from the base station, receive, from the UE, a second message including a report of the signal strength of the SSB beams, send, to the UE, a third message indicating at least an SSB beam of the SSB beams or a quasi-colocation (QCL) type to use based on the report, and establish a connection with the UE using an indicated SSB beam or QCL type.

In one example, a method of dynamically modifying a synchronization signal block (SSB) beam configuration at a user equipment (UE) is disclosed. The method includes receiving, from a base station, a first message triggering the UE to measure a signal strength of SSB beams transmitted from the base station, sending, to the base station, a second message including a report of the signal strength of the SSB beams, receiving, from the base station, a third message indicating at least an SSB beam of the SSB beams or a quasi-colocation (QCL) type to use based on the report, and establishing a connection with the base station using an indicated SSB beam or QCL type.

In another example, a user equipment (UE) for dynamically modifying a synchronization signal block (SSB) beam configuration is disclosed. The UE includes at least one processor and a memory coupled to the at least one processor. The at least one processor and the memory are configured to receive, from a base station, a first message triggering the UE to measure a signal strength of SSB beams transmitted from the base station, send, to the base station, a second message including a report of the signal strength of the SSB beams, receive, from the base station, a third message indicating at least an SSB beam of the SSB beams or a quasi-colocation (QCL) type to use based on the report, and establish a connection with the base station using an indicated SSB beam or QCL type.

In a further example, a user equipment (UE) for dynamically modifying a synchronization signal block (SSB) beam configuration is disclosed. The UE includes means for receiving, from a base station, a first message triggering the UE to measure a signal strength of SSB beams transmitted from the base station, means for sending, to the base station, a second message including a report of the signal strength of the SSB beams, means for receiving, from the base station, a third message indicating at least an SSB beam of the SSB beams or a quasi-colocation (QCL) type to use based on the report, and means for establishing a connection with the base station using an indicated SSB beam or QCL type.

In another example, a non-transitory computer-readable medium storing code at a user equipment (UE) is disclosed. The code includes instructions executable by a processor to receive, from a base station, a first message triggering the UE to measure a signal strength of SSB beams transmitted from the base station, send, to the base station, a second message including a report of the signal strength of the SSB beams, receive, from the base station, a third message indicating at least an SSB beam of the SSB beams or a quasi-colocation (QCL) type to use based on the report, and establish a connection with the base station using an indicated SSB beam or QCL type.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
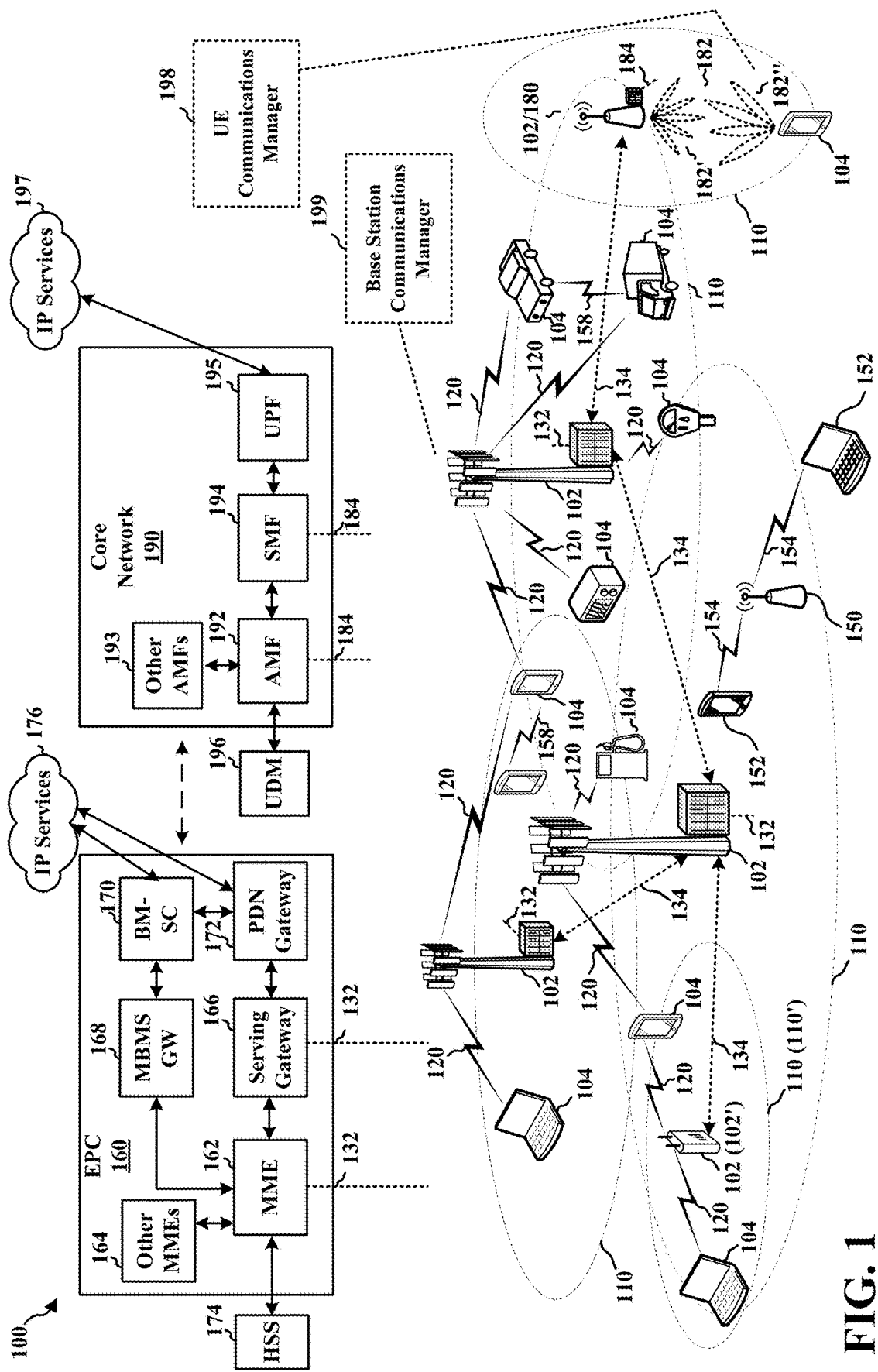
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Aspects of the disclosure support dynamic modification of synchronization signal block (SSB) beam configurations. For example, if a base station (e.g., gNB) determines to add one or more SSB beams to an SSB beam configuration, the base station may inform a UE of a modified SSB beam configuration including the SSB beams to be added. Thereafter, the base station may trigger the UE to measure a signal strength of SSB beams (including the added SSB beams) transmitted from the base station and the UE sends a report of the signal strength measurement. Based on the received report, the base station may indicate to the UE an added SSB beam (or a quasi-colocation (QCL) type corresponding to the added SSB beam) to switch to for establishing a connection with the base station.

In another example, if the base station determines to remove one or more SSB beams from an SSB beam configuration, the base station may trigger the UE to measure a signal strength of SSB beams that will remain active in a modified SSB beam configuration and the UE sends a report of the signal strength measurement. Based on the received report, the base station may indicate an SSB beam (or a QCL type corresponding to the SSB beam) to switch to that will remain active in the modified SSB beam configuration for establishing a connection with the base station.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a UE communications manager 198 that may be configured to receive, from a base station, a first message triggering the UE to measure a signal strength of SSB beams transmitted from the base station and send, to the base station, a second message including a report of the signal strength of the SSB beams. The UE communications manager 198 may further be configured to receive, from the base station, a third message indicating at least an SSB beam of the SSB beams or a quasi-colocation (QCL) type to use based on the report and establish a connection with the base station using an indicated SSB beam or QCL type.

Referring again to FIG. 1, in certain aspects, the base station 102 may include a base station communications manager 199 that may be configured to determine to modify an SSB beam configuration and send, to a user equipment (UE), a first message triggering the UE to measure a signal strength of SSB beams transmitted from the base station. The base station communications manager 199 may further be configured to receive, from the UE, a second message including a report of the signal strength of the SSB beams, send, to the UE, a third message indicating at least an SSB beam of the SSB beams or a quasi-colocation (QCL) type to use based on the report, and establish a connection with the UE using an indicated SSB beam or QCL type.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kKz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
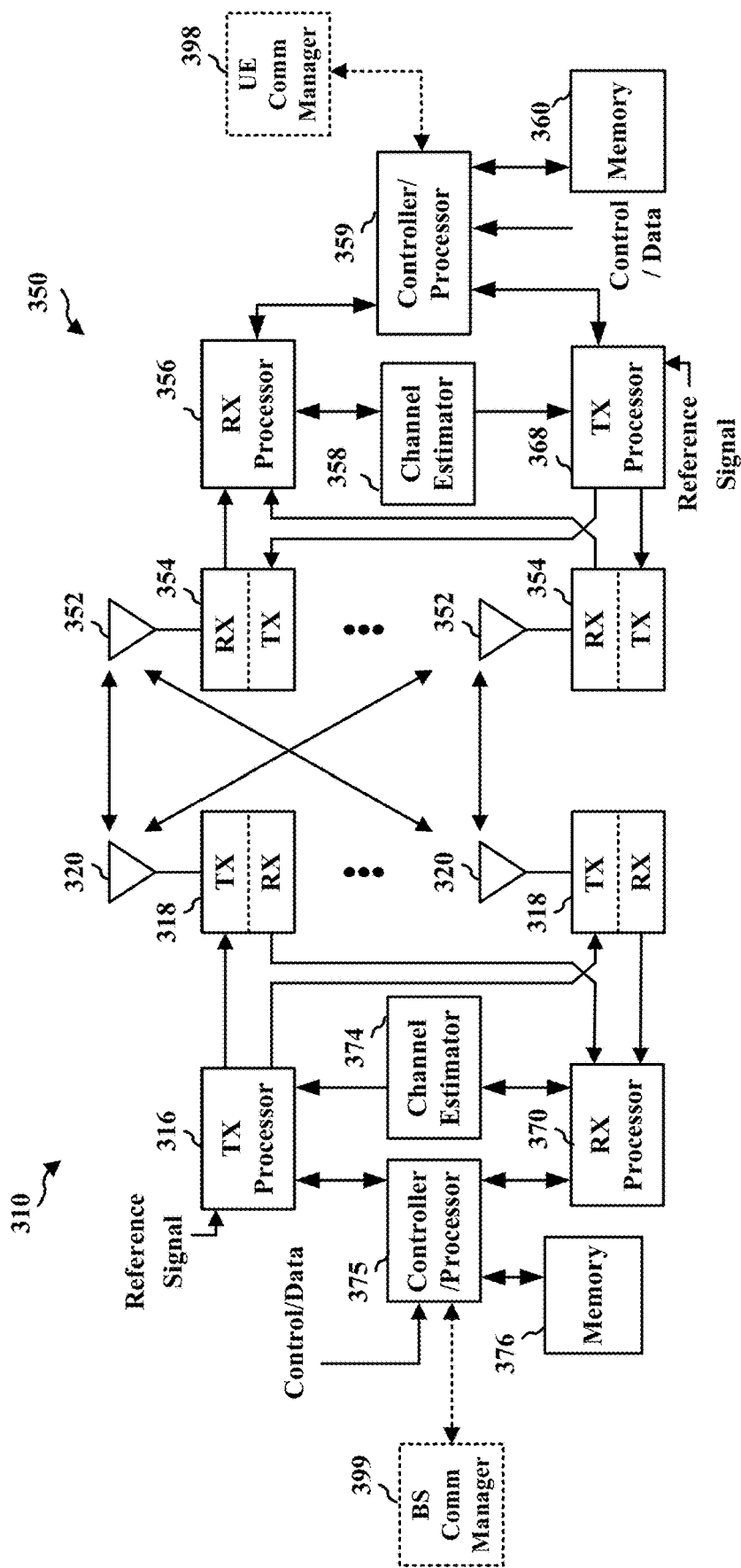
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the UE communications manager 198 of FIG. 1. For example, the UE 350 may include a UE communications manager 398 configured to perform the operations described above with respect to the UE communications manager 198 of FIG. 1.

At least one of the TX processor 316, the RX processor 370, and the controller/processor 375 may be configured to perform aspects in connection with the BS communications manager 199 of FIG. 1. For example, the BS 310 may include a BS communications manager 399 configured to perform the operations described above with respect to the BS communications manager 199 of FIG. 1.

A beamforming technology (e.g., 5G NR mmW technology) may use beam management procedures, such as beam measurements and beam switches, to maintain a quality of a link between a base station (e.g., gNB) and a UE at a sufficient level. Beam management procedures aim to support mobility and the selection of the best beam pairing (or beam pair link (BPL)) between the base station and the UE. Beam selection may be based on a number of considerations including logical state, power saving, robustness, mobility, throughput, etc. For example, wide beams may be used for initial connection and for coverage/mobility and narrow beams may be used for high throughput scenarios with low mobility.

Figure 4A:
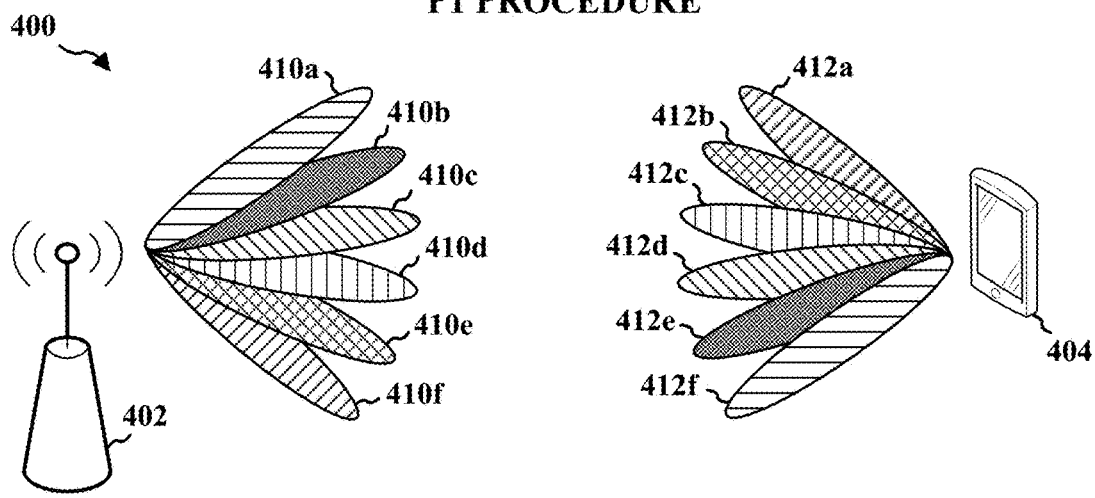
FIGS. 4A, 4B, and 4C illustrate an example of beam pair link (BPL) discovery and refinement in accordance with aspects of the present disclosure.
Figure 4B:
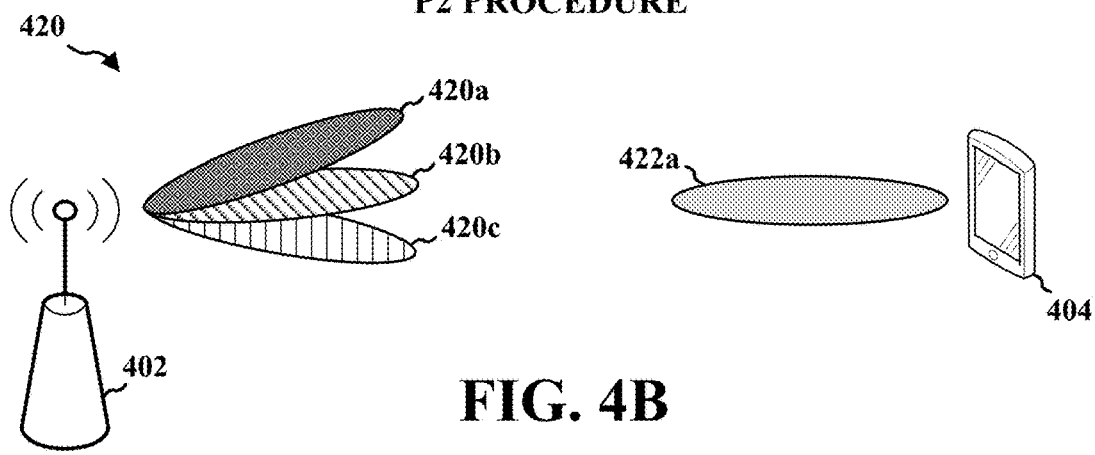
Figure 4C:
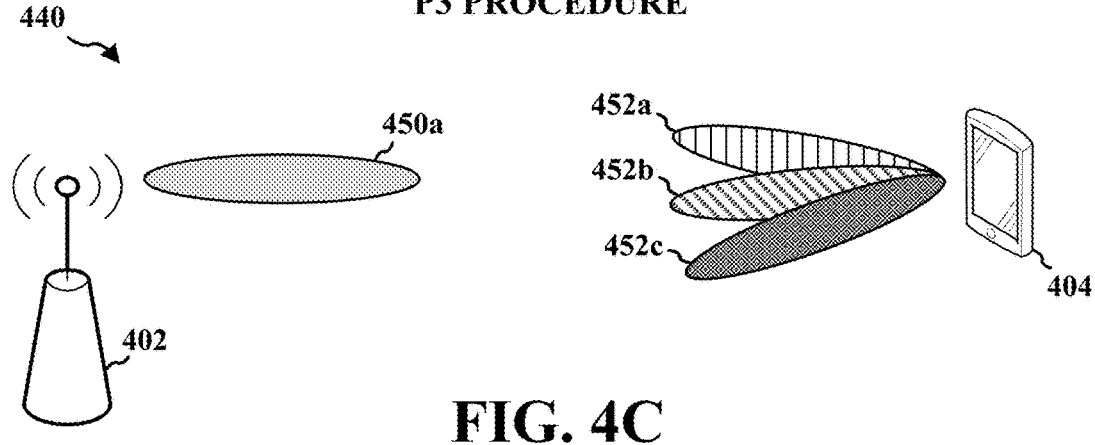

FIGS. 4A, 4B, and 4C illustrate an example of beam pair link (BPL) discovery and refinement. In 5G-NR, P1, P2, and P3 procedures are used for BPL discovery and refinement. The network uses a P1 procedure to enable the discovery of new BPLs. Referring to FIG. 4A, in a P1 procedure 400, a BS 402 transmits different symbols of a reference signal (e.g., P1 signal), each beamformed in a different spatial direction such that several (most, all) relevant places of the cell are reached. Stated otherwise, the BS 402 transmits beams using different transmit beams (e.g., transmit beams 410a to 410f) over time in different directions. For successful reception of at least a symbol of the P1 signal, a UE 404 searches for an appropriate receive beam. The UE 404 searches using available receive beams (e.g., receive beams 412a to 412f) and applying a different UE receive beam during each occurrence of the periodic P1 signal.

Once the UE 404 has succeeded in receiving a symbol of the P1 signal, the UE 404 has discovered a BPL. In some aspects, the UE 404 may not want to wait until it has found the best UE receive beam, since this may delay further actions. The UE 404 may measure a signal strength (e.g., reference signal receive power (RSRP)) and report the symbol index together with the RSRP to the BS 402. Such a report may contain the findings of one or more BPLs. In an example, the UE 404 may determine a received signal having a high RSRP. The UE 404 may not know which transmit beam the BS 402 used to transmit; however, the UE 404 may report to the BS 404 the time at which it observed the signal having a high RSRP. The BS 402 may receive this report and may determine which transmit beam the BS 402 used at the given time.

The BS 402 may then offer P2 and P3 procedures to refine an individual BPL. Referring to FIG. 4B, the P2 procedure 420 refines the BS beam (transmit beam) of a BPL. The BS 402 may transmit a set of symbols of a reference signal with different BS beams that are spatially close to the BS beam of the BPL (i.e., the BS 402 performs a sweep using neighboring beams around the selected beam). For example, the BS 402 may transmit a plurality of transmit beams (e.g., transmit beams 420a, 420b, and 420c) over a consecutive sequence of symbols, with a different beam per symbol. In the P2 procedure 420, the UE 404 keeps its receive beam (e.g., receive beam 422a) constant. Thus, the UE 404 uses the same beam as in the BPL. The BS beams used for the P2 procedure 420 may be different from those used for the P1 procedure in that they may be spaced closer together or they may be more focused. The UE 404 may measure the signal strength (e.g., RSRP) for the various BS beams (e.g., beams 420a, 420b, and 420c) and indicate the strongest BS beam and/or the highest RSRP to the BS 402. Additionally or alternatively, the UE 404 may indicate all RSRPs measured for the BS beams. The UE 404 may indicate such information via a CSI-RS resource indicator (CRI)-L1-RSRP feedback message, which may contain the BS beams' RSRPs in a sorted manner. The BS 402 may switch an active beam to the strongest BS beam reported, thus keeping the BPL's RSRP at a highest level and supporting low mobility. If the transmit beams used for the P2 procedure are spatially close (or even partially overlapped), no beam switch notification may be sent to the UE 404.

Referring to FIG. 4C, the P3 procedure 440 refines the UE beam (receive beam) of a BPL. Here, the BS 402 transmits the same transmit beam 450a over a consecutive sequence of symbols. The UE 404 may use this opportunity to refine the UE receive beam by checking a strength of multiple receive beams (from the same or different UE panels). That is, while the BS beam stays constant, the UE 404 may scan using different receive beams (i.e., the UE 404 performs a sweep using neighboring beams (e.g., receive beams 452a, 452b, and 452c)). The UE 404 may measure the RSRP of each UE beam (receive beam) and identify the best UE beam. Afterwards, the UE 404 may use the best UE beam for the BPL. The UE 404 may or may not send a report of receive beam RSRP(s) to the BS 402. By the end of the P2 and P3 procedures, the refined BS transmit beam and the refined UE receive beam maximize the BPL's RSRP.

In 5G NR, synchronization signal blocks (SSBs) may be used for used for initial cell detection and beam management (e.g., P1 procedure). For example, in order for a UE to detect/acquire a beam for initial attachment (establishing a connection) with a base station (e.g., gNB), the base station may transmit a sequence of SSB beams in different directions. The UE may detect a best SSB beam among the sequence of SSB beams and send a physical random access channel (PRACH) to a location that is mapped to a specific SSB beam ID. The base station may determine the SSB beam that the UE detected by the PRACH sent from the UE.

In FR2, the base station may configure up to 64 different SSBs within each SSB burst set to advertise initial connection beams. An SSB burst set may have a periodicity (e.g., typically 20 ms, 40 ms, etc.). In each period, the base station transmits the SSBs using a same spatial filter (same analog beamforming). For example, if the base station transmits SSB #7 every 20 ms, SSB #7 will be transmitted using the same spatial filter/analog beamforming. As such, the UE attempting initial access to the base station will assume that the SSBs are transmitted from the base station with the same periodicity and the same analog beamforming. In an aspect, while the base station may use the SSBs to advertise the initial connection beams, the base station can later change the beams after an actual connection is established with the UE.

In aspect, dynamically changing the amount of SSBs used for initial cell detection and beam management can increase system efficiency and throughput. For example, the base station may initially use a small amount of SSBs (out of a maximum 64 SSBs) when light or no activity is present in the cell. Notably, the base station uses wide beams when the smaller number of SSBs are used in order to cover all angular/spatial space. Thereafter, the base station may transition to using a larger amount of SSBs with narrower beams when activity increases in the cell or when UEs require use of the narrower beams. This allows the base station and the UEs to save power. In another example, dynamically changing the amount of SSBs supports UEs which are about to move out of a coverage area until handover. For instance, if the base station is connected to a UE moving out of the coverage area, the base station can define or initiate a new SSB/SSB beam so that the connection with the UE may be maintained until the UE hands over to another cell if available. In a further example, dynamically changing the amount of SSBs to a smaller number of SSBs may lower interference to other cells when no activity is present in the cell.

Currently, a base station may need to go offline (e.g., power off) and reboot (e.g., power back on as a new base station) to change the amount of SSBs used. Once the base station is powered on, only a fixed (pre-defined) number of SSBs are available for use and the number of SSBs may not be dynamically changed. Accordingly, aspects of the present disclosure are directed to enabling the base station to dynamically update/modify an SSB configuration/SSB beam pattern in order to add or remove SSBs/SSB beams from the SSB configuration/SSB beam pattern. Advantages to the base station being able to dynamically change the SSB configuration include: 1) More flexibility to adapt to a changing environment, e.g., no cell activity, light cell activity, decreased/increased cell activity, UEs closer to the cell, UEs reaching edges of the cell coverage, etc.; 2) Reduced power use by reducing number of SSBs when not required—allows base stations (e.g., gNBs or eNBs) to save power when no users are present in the cell; 3) Improved coverage by allocating narrow SSB beams when a UE is about to move out of a coverage area (i.e., when the UE actually needs to use the narrower SSB beams); and 4) Less interference generated in the environment by transmitting less SSBs when there is no activity in the cell. Although aspects disclosed herein may be described with reference to FR2, it is contemplated that such aspects are also applicable to higher bands (e.g., sub-THz band (95 GHz-3 THz)).

Figure 5A:
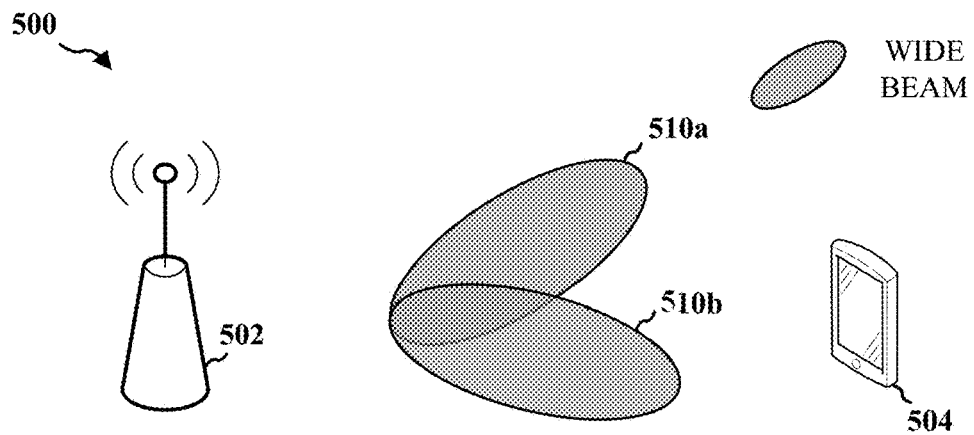
FIG. 5A is a diagram illustrating a base station transmitting wide synchronization signal block (SSB) beams toward a UE in accordance with aspects of the present disclosure.
Figure 5B:
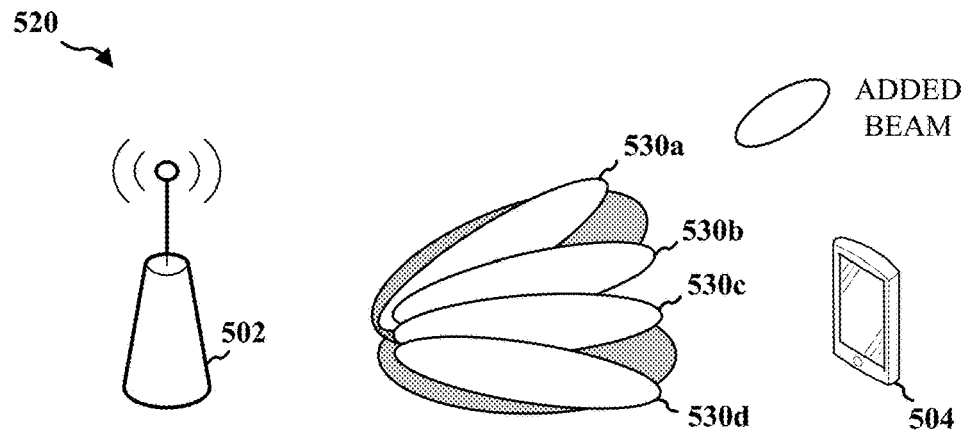
FIG. 5B is a diagram illustrating a base station transmitting additional narrower SSB beams toward a UE in accordance with aspects of the present disclosure.
Figure 5C:
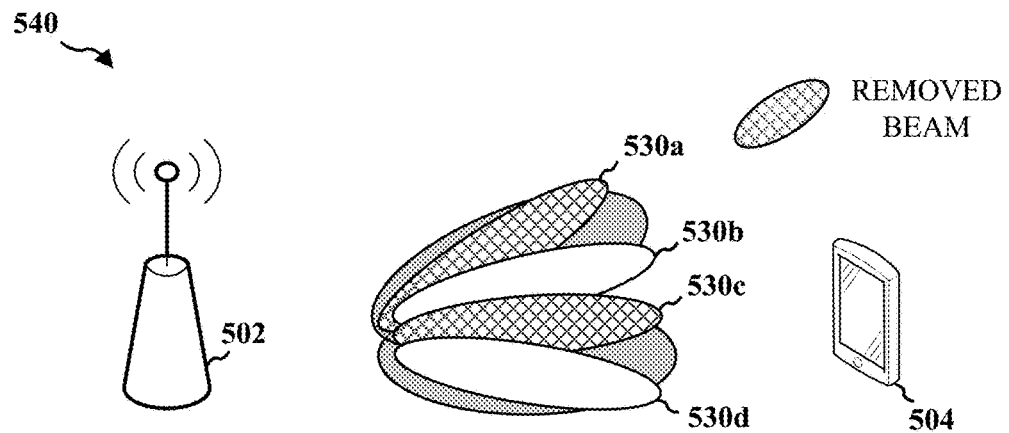
FIG. 5C is a diagram illustrating a base station removing (ceasing transmission of) one or more SSB beams transmitted toward a UE in accordance with aspects of the present disclosure.

FIG. 5A is a diagram 500 illustrating a base station 502 transmitting wide SSB beams 510a and 510b toward a UE 504. FIG. 5B is a diagram 520 illustrating the base station 502 transmitting additional narrower SSB beams 530a, 530b, 530c, and 530d toward the UE 504. FIG. 5C is a diagram 540 illustrating the base station 502 removing (ceasing transmission of) one or more SSB beams transmitted toward the UE 504.

Referring to FIG. 5A, the base station 502 may initially have a small number of SSBs using wide beams (e.g., wide SSB beams 510a and 510b) to cover a sector's spatial dimensions. Referring to FIG. 5B, when the base station 502 identifies a need to introduce narrower SSB beams (e.g., to increase coverage for marginal UEs, compensate for additional cell activity, improve UE separation, etc.), the base station 502 may introduce additional narrower SSB beams (e.g., narrower beams 530a, 530b, 530c, and 530d) for use.

In an aspect, in order for the base station 502 (e.g., gNB) to introduce the additional narrower SSB beams, the base station 502 may inform the UE 504 of the new SSB beams using an existing or newly defined system information block (SIB). This is required for UEs in the cell already using the current SSBs (e.g., for rate matching). UEs new to the cell will perceive the new SSBs/SSB beams as if they were always in use.

In an aspect, quasi-colocation (QCL) may define a correlation between symbols from different antenna ports. Two antenna ports may be quasi-colocated if properties of a channel over which a symbol on one antenna port is conveyed can be inferred from a channel over which a symbol on the other antenna port is conveyed. Four different types of QCL may be defined: 1) QCL type-A; 2) QCL type-B; 3) QCL type-C; and 4) QCL type-D. For example, a signal from one antenna port may be quasi-colocated with another signal from another antenna port via QCL type-A if the signals share a similar channel condition with respect to Doppler shift, Doppler spread, average delay, and delay spread. A signal from one antenna port may be quasi-colocated with another signal from another antenna port via QCL type-B if the signals share a similar channel condition with respect to Doppler shift and Doppler spread. A signal from one antenna port may be quasi-colocated with another signal from another antenna port via QCL type-C if the signals share a similar channel condition with respect to average delay and Doppler shift. A signal from one antenna port may be quasi-colocated with another signal from another antenna port via QCL type-D if the signals share a similar channel condition with respect to a spatial Rx parameter (spatial filter).

Referring to FIG. 5C, when the base station 502 intends to remove (cease transmission of) one or more of the new narrower SSB beams (e.g., removed narrower beam 530*a* and removed narrower beam 530*c*), the base station 502 may report to the UE 504 which SSBs were removed and which remaining SSB beam can be used with the same QCL type (e.g., QCL type-D) as the SSB beams that were removed. This allows for UEs using the removed narrower SSB beams based on a particular QCL type to transition to wider SSB beams of the same QCL type.

Figure 6:
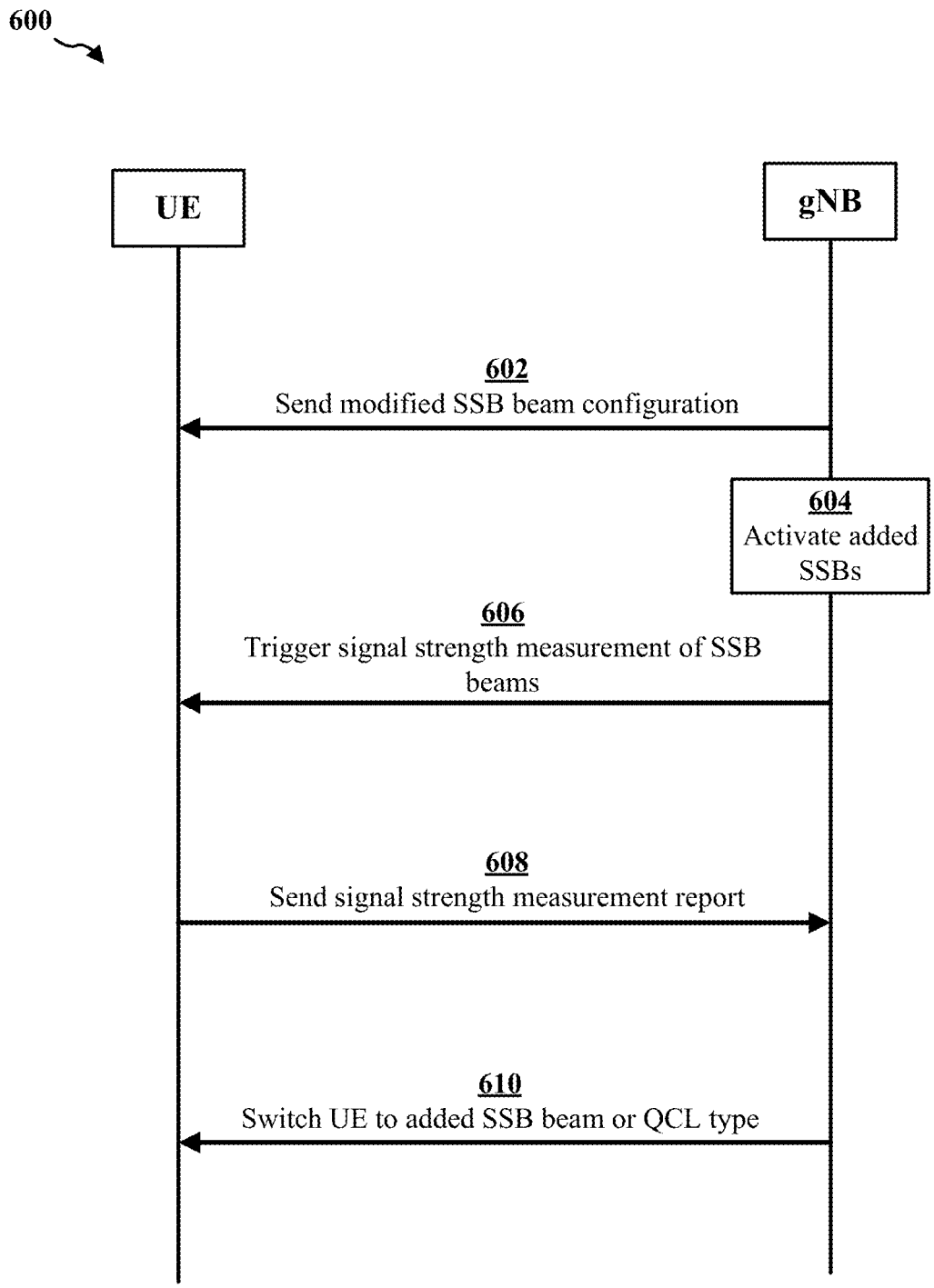
FIG. 6 is a flow diagram illustrating a method of adding SSB beams to an SSB beam configuration.

FIG. 6 is a flow diagram 600 illustrating a method of adding SSB beams to an SSB beam configuration. At 602, a gNB sends a modified SSB beam configuration to a UE. The modified SSB beam configuration includes the SSB beams to be added. Moreover, the modified SSB beam configuration may be sent in a broadcast, multicast, groupcast, or unicast manner. In an aspect, an ssb-PositionsInBurst message may be used to signal which SSBs out of 64 different SSBs in FR2 are active in an SSB burst set. As such, the gNB may send a modified ssb-PositionsInBurst message to indicate which SSBs (including the SSBs to be added) are active to be used.

At 604, the gNB activates the SSBs added to the SSB beam configuration. At 606, the gNB sends a message to the UE triggering the UE to measure a signal strength of SSB beams (including the added SSB beams) of the modified SSB beam configuration. For example, the gNB may trigger the UE to perform a L1-reference signal receive power (RSRP) measurement or a L1-signal-to-interference-plus-noise ratio (SINR) measurement of the SSB beams. At 608, the UE sends a report of the signal strength measurement (e.g., L1-RSRP or L1-SINR measurement) to the gNB. At 610, based on the received report, the gNB sends a message to the UE indicating an added SSB beam (or a quasi-colocation (QCL) type corresponding to the added SSB beam) to switch to for establishing a connection with the gNB. Thereafter, the UE may switch to the added SSB beam or QCL type of the modified SSB beam configuration to establish the connection with the gNB.

Figure 7:
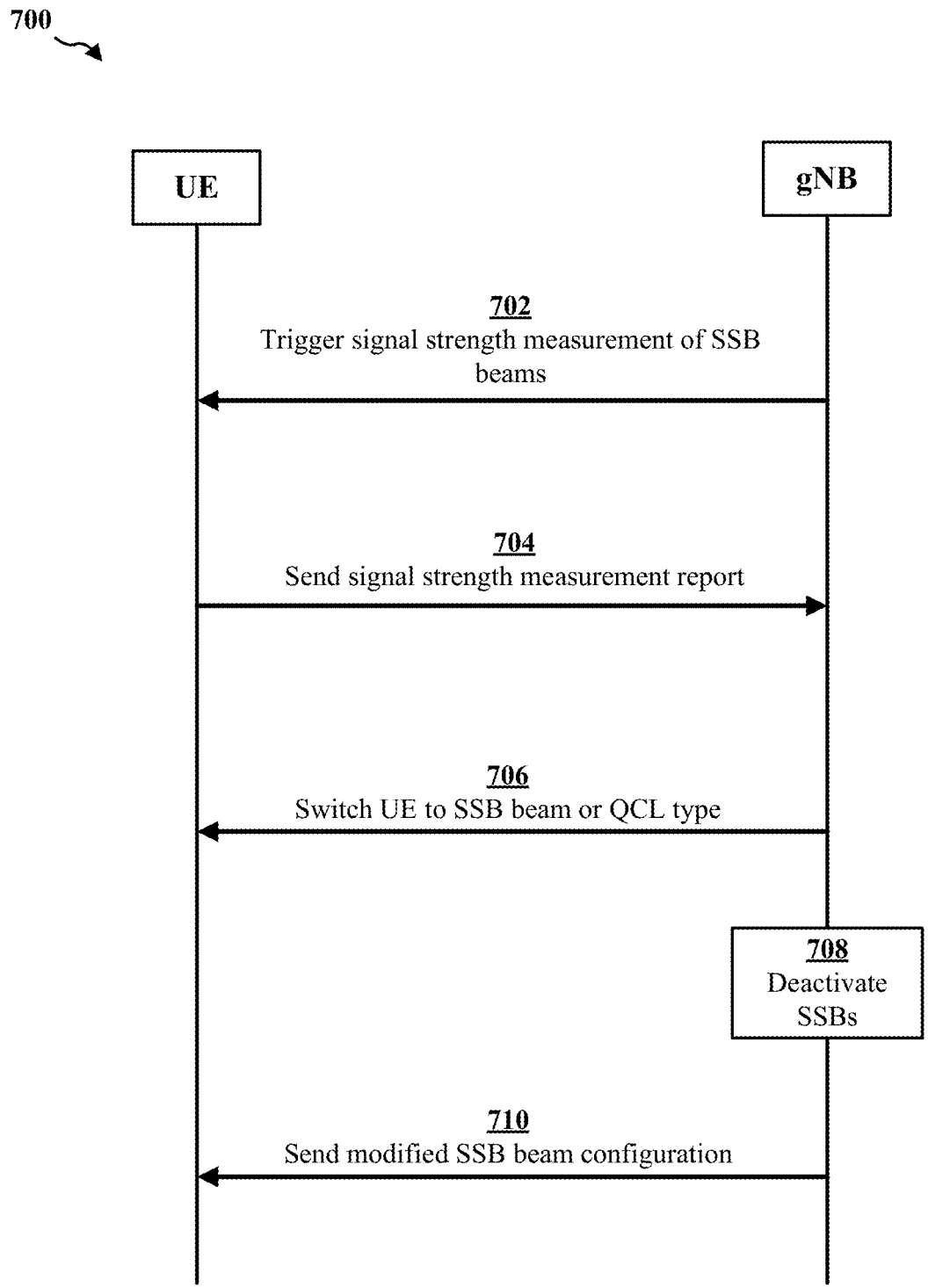
FIG. 7 is a flow diagram illustrating a method of removing SSB beams from an SSB beam configuration.

FIG. 7 is a flow diagram 700 illustrating a method of removing SSB beams from an SSB beam configuration. At 702, a gNB sends a message to a UE triggering the UE to measure a signal strength of SSB beams that will remain active in a modified SSB beam configuration. For example, the gNB may trigger the UE to perform a L1-RSRP measurement or a L1-SINR measurement of the SSB beams. At 704, the UE sends a report of the signal strength measurement (e.g., L1-RSRP or L1-SINR measurement) to the gNB.

At 706, based on the received report, the gNB sends a message to the UE indicating an SSB beam (or a QCL type corresponding to the SSB beam) to switch to that will remain active in the modified SSB beam configuration. In an aspect, if the UE currently uses an SSB beam for beam management that will be deactivated, then the UE will switch away from the SSB beam to be deactivated. If the UE uses an SSB beam different from the SSB beam to be deactivated, but the UE uses a QCL type corresponding to the SSB beam to be deactivated, then the UE will switch to a QCL type (e.g., substitute QCL type) corresponding to an SSB beam that will remain active.

At 708, the gNB deactivates the SSBs removed from the modified SSB beam configuration. At 710, the gNB sends the modified SSB beam configuration to the UE (e.g., via a modified ssb-PositionsInBurst message). The modified SSB beam configuration excludes the deactivated SSB beams. Moreover, the modified SSB beam configuration may be sent in a broadcast, multicast, groupcast, or unicast manner Thereafter, the UE may switch to a remaining active beam or QCL type of the modified SSB beam configuration to establish a connection with the gNB.

Figure 8:
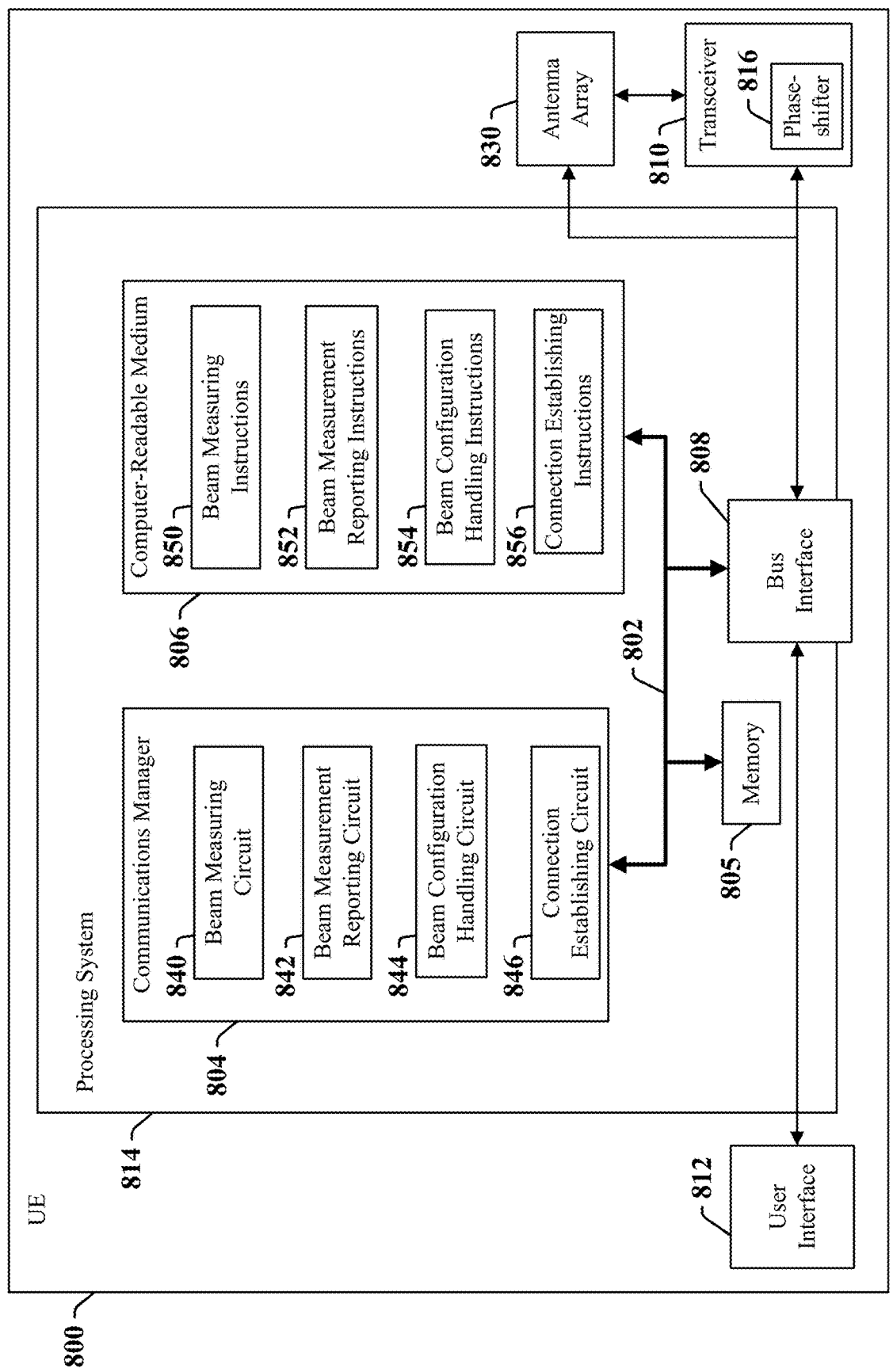
FIG. 8 is a block diagram illustrating an example of a hardware implementation for an exemplary UE employing a processing system in accordance with aspects of the present disclosure.

FIG. 8 is a block diagram illustrating an example of a hardware implementation for an exemplary UE 800 employing a processing system 814. For example, the UE 800 may be a UE, as illustrated in any one or more of FIGS. 1 and 3-7. The UE 800 may be implemented with a processing system 814 that includes one or more processors 804 (e.g., communications manager). Examples of processors 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 800 may be configured to perform any one or more of the functions described herein. That is, the processor 804, as utilized in a UE 800, may include the UE communications manager 198/398 and used to implement any one or more of the processes and procedures described below and illustrated in FIG. 9.

In this example, the processing system 814 may be implemented with a bus architecture, represented generally by the bus 802. The bus 802 may include any number of interconnecting buses and bridges depending on the specific application of the processing system 814 and the overall design constraints. The bus 802 communicatively couples together various circuits including one or more processors (represented generally by the processor 804), a memory 805, and computer-readable media (represented generally by the computer-readable medium 806). The bus 802 may also link various other circuits such as timing sources, peripherals, voltage regulators, and power management circuits, which are well known in the art, and therefore, will not be described any further. A bus interface 808 provides an interface between the bus 802 and a transceiver 810. The transceiver 810 provides a communication interface or means for communicating with various other apparatus over a transmission medium. In some examples, the transceiver 810 may include a phase-shifter 816 for digital and/or analog beamforming via one or more antenna array(s) 830. Depending upon the nature of the apparatus, a user interface 812 (e.g., keypad, display, speaker, microphone, joystick) may also be provided. Of course, such a user interface 812 is optional, and may be omitted in some examples, such as a base station.

In some aspects of the disclosure, the processor 804 (e.g., UE communications manager 198/398) may include beam measuring circuitry 840 configured for various functions, including, for example, receiving, from a base station, a first message triggering the UE to measure a signal strength of SSB beams transmitted from the base station. For example, the beam measuring circuitry 840 may be configured to implement one or more of the functions described below in relation to FIG. 9, including, e.g., block 906. The processor 804 may also include beam measurement reporting circuitry 842 configured for various functions, including, for example, sending, to the base station, a second message including a report of the signal strength of the SSB beams. For example, the beam measurement reporting circuitry 842 may be configured to implement one or more of the functions described below in relation to FIG. 9, including, e.g., block 908. The processor 804 may also include beam configuration handling circuitry 844 configured for various functions, including, for example, sending a request to the base station to modify an SSB beam configuration, receiving, from the base station, a modified SSB beam configuration including at least one added SSB beam, and receiving, from the base station, the modified SSB beam configuration excluding at least one excluded SSB beam. For example, the beam configuration handling circuitry 844 may be configured to implement one or more of the functions described below in relation to FIG. 9, including, e.g., blocks 902, 904, and 912. The processor 804 may also include connection establishing circuitry 846 configured for various functions, including, for example, receiving, from the base station, a third message indicating at least an SSB beam of the SSB beams or a quasi-colocation (QCL) type to use based on the report and establishing a connection with the base station using an indicated SSB beam or QCL type. For example, the connection establishing circuitry 846 may be configured to implement one or more of the functions described below in relation to FIG. 9, including, e.g., blocks 910 and 914.

The processor 804 is responsible for managing the bus 802 and general processing, including the execution of software stored on the computer-readable medium 806. The software, when executed by the processor 804, causes the processing system 814 to perform the various functions described below for any particular apparatus. The computer-readable medium 806 and the memory 805 may also be used for storing data that is manipulated by the processor 804 when executing software.

One or more processors 804 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 806. The computer-readable medium 806 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 806 may reside in the processing system 814, external to the processing system 814, or distributed across multiple entities including the processing system 814. The computer-readable medium 806 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 806 may include beam measuring instructions 850 configured for various functions, including, for example, receiving, from a base station, a first message triggering the UE to measure a signal strength of SSB beams transmitted from the base station. For example, the beam measuring instructions 850 may be configured to implement one or more of the functions described below in relation to FIG. 9, including, e.g., block 906. The computer-readable storage medium 806 may also include beam measurement reporting instructions 852 configured for various functions, including, for example, sending, to the base station, a second message including a report of the signal strength of the SSB beams. For example, the beam measurement reporting instructions 852 may be configured to implement one or more of the functions described below in relation to FIG. 9, including, e.g., block 908. The computer-readable storage medium 806 may also include beam configuration handling instructions 854 configured for various functions, including, for example, sending a request to the base station to modify an SSB beam configuration, receiving, from the base station, a modified SSB beam configuration including at least one added SSB beam, and receiving, from the base station, the modified SSB beam configuration excluding at least one excluded SSB beam. For example, the beam configuration handling instructions 854 may be configured to implement one or more of the functions described below in relation to FIG. 9, including, e.g., blocks 902, 904, and 912. The computer-readable storage medium 806 may also include connection establishing instructions 856 configured for various functions, including, for example, receiving, from the base station, a third message indicating at least an SSB beam of the SSB beams or a quasi-colocation (QCL) type to use based on the report and establishing a connection with the base station using an indicated SSB beam or QCL type. For example, the connection establishing instructions 856 may be configured to implement one or more of the functions described below in relation to FIG. 9, including, e.g., blocks 910 and 914.

Figure 9:
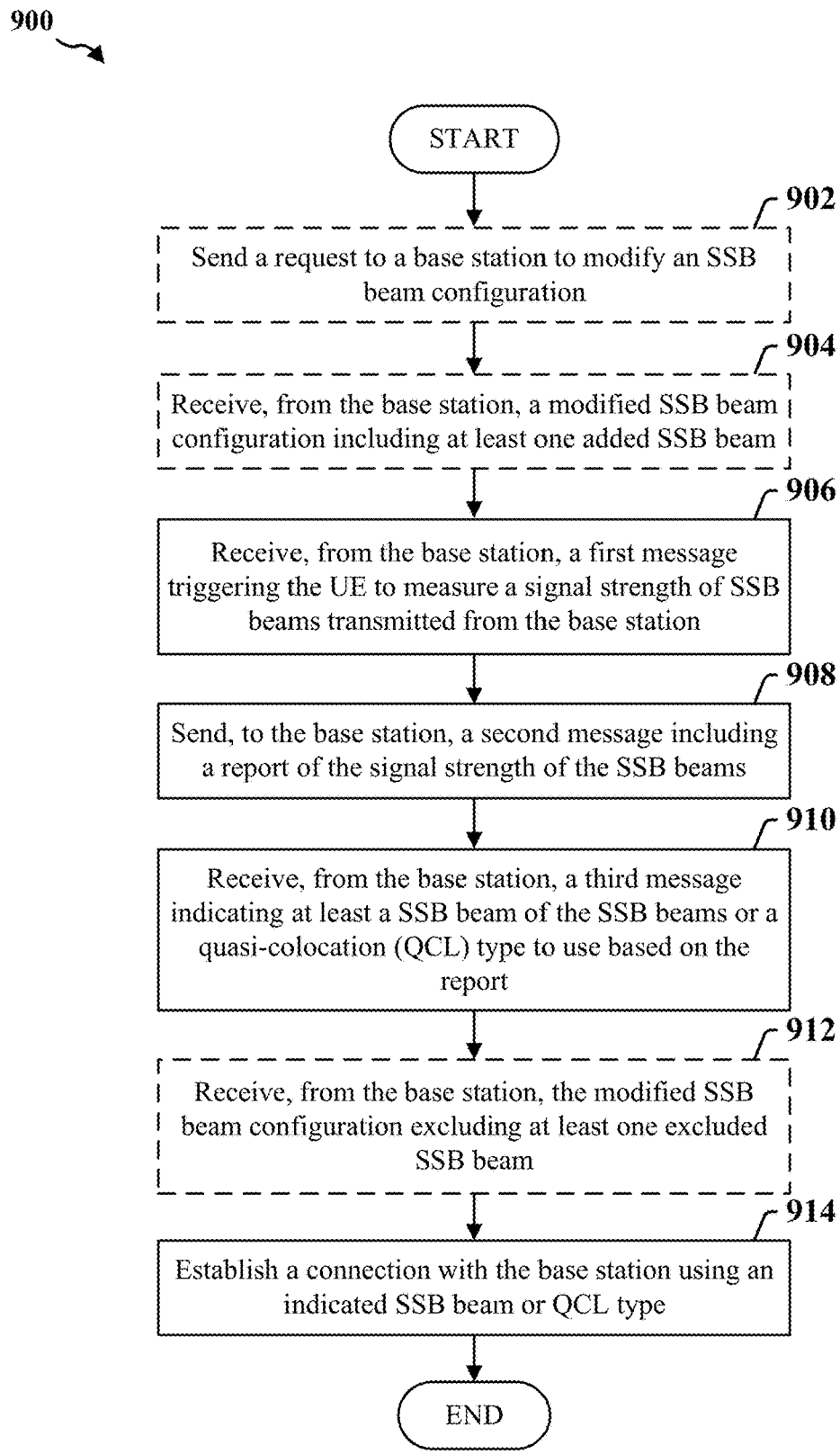
FIG. 9 is a flow chart illustrating an exemplary process for dynamically modifying a synchronization signal block (SSB) beam configuration at a user equipment (UE) in accordance with aspects of the present disclosure.

FIG. 9 is a flow chart illustrating an exemplary process 900 for dynamically modifying a synchronization signal block (SSB) beam configuration at a user equipment (UE) in accordance with aspects of the present disclosure. In some aspects, one or more SSB beams may be added to the SSB beam configuration. In other aspects, one or more SSB beams may be removed from the SSB beam configuration. As described below, some or all illustrated features may be omitted in a particular implementation within the scope of the present disclosure, and some illustrated features may not be required for implementation of all aspects. In some examples, the process 900 may be carried out by the UE 800 illustrated in FIG. 8, which may be a UE, as illustrated in any one or more of FIGS. 1 and 3-7. In some examples, the process 900 may be carried out by any suitable apparatus or means for carrying out the functions or algorithm described below.

At block 902, the UE may send a request to the base station to modify an SSB beam configuration. In an aspect, if one or more SSB beams are being added to the SSB beam configuration, at block 904, the UE may receive, from the base station, a modified SSB beam configuration including at least one added SSB beam. For example, the modified SSB beam configuration may be received via a system information block (SIB) message.

At block 906, the UE may receive, from the base station, a first message triggering the UE to measure a signal strength of SSB beams transmitted from the base station. In an aspect, if at least one SSB beam is being added to the SSB beam configuration, then the first message triggers the UE to measure the signal strength of the SSB beams including the at least one added SSB beam. For example, the UE may measure the signal strength by measuring a reference signal receive power (RSRP) and/or a signal-to-interference-plus-noise ratio (SINR) of the SSB beams including the at least one added SSB beam. In another aspect, if at least one SSB beam is to be excluded/omitted from the SSB beam configuration, then the first message triggers the UE to measure the signal strength of the SSB beams excluding the at least one excluded/omitted SSB beam. For example, the UE may measure the signal strength by measuring a reference signal receive power (RSRP) and/or signal-to-interference-plus-noise ratio (SINR) of the SSB beams excluding the at least one excluded/omitted SSB beam. At block 908, the UE may send, to the base station, a second message including a report of the signal strength of the SSB beams.

At block 910, the UE may receive, from the base station, a third message indicating at least an SSB beam of the SSB beams or a quasi-colocation (QCL) type to use based on the report. In an aspect, if at least one SSB beam is being added to the SSB beam configuration, then the third message indicates the at least one added SSB beam. In another aspect, if at least one SSB beam is to be excluded/omitted from the SSB beam configuration, then the third message indicates at least one remaining SSB beam remaining in the modified SSB beam configuration or a QCL type corresponding to the at least one remaining SSB beam. Additionally and/or alternatively, if the at least one SSB is to be excluded/omitted from the SSB beam configuration, then the third message indicates a substitute QCL type for the UE to use in place of a QCL type used for the at least one excluded SSB beam.

In an aspect, if at least one SSB beam is to be excluded/omitted from the SSB beam configuration, at block 912, the UE may receive, from the base station, the modified SSB beam configuration excluding the at least one excluded SSB beam. For example, the modified SSB beam configuration may be received via a system information block (SIB) message.

At block 914, the UE may establish a connection with the base station using an indicated SSB beam or QCL type. For example, the UE may use the at least one added SSB beam added to the modified SSB beam configuration (as indicated in the third message) to establish the connection. Moreover, the UE may use the at least one remaining SSB beam remaining in the modified SSB beam configuration or the QCL type corresponding to the at least one remaining SSB beam (as alternatively indicated in the third message) to establish the connection. The UE may also use the substitute QCL type (as alternatively indicated in the third message) in place of a previously used QCL type (for an excluded SSB beam) to establish the connection.

In one configuration, the UE 800 for wireless communication includes means for sending (e.g., beam configuration handling circuitry 844, transceiver 810, and/or antenna array 830) a request to a base station to modify an SSB beam configuration, means for receiving (e.g., beam configuration handling circuitry 844, transceiver 810, and/or antenna array 830), from the base station, a modified SSB beam configuration including at least one added SSB beam, means for receiving (e.g., beam measuring circuitry 840, transceiver 810, and/or antenna array 830), from the base station, a first message triggering the UE to measure a signal strength of SSB beams transmitted from the base station, means for sending (e.g., beam measurement reporting circuitry 844, transceiver 810, and/or antenna array 830), to the base station, a second message including a report of the signal strength of the SSB beams, means for receiving (e.g., connection establishing circuitry 846, transceiver 810, and/or antenna array 830), from the base station, a third message indicating at least an SSB beam of the SSB beams or a quasi-colocation (QCL) type to use based on the report, means for receiving (e.g., beam configuration handling circuitry 842, transceiver 810, and/or antenna array 830), from the base station, the modified SSB beam configuration excluding at least one excluded SSB beam, and means for establishing (e.g., connection establishing circuitry 846, transceiver 810, and/or antenna array 830) a connection with the base station using an indicated SSB beam or QCL type. In one aspect, the aforementioned means may be the processor 804 shown in FIG. 8 configured to perform the functions recited by the aforementioned means. In another aspect, the aforementioned means may be a circuit or any apparatus configured to perform the functions recited by the aforementioned means.

Of course, in the above examples, the circuitry included in the processor 804 is merely provided as an example, and other means for carrying out the described functions may be included within various aspects of the present disclosure, including but not limited to the instructions stored in the computer-readable storage medium 806, or any other suitable apparatus or means described in any one of the FIGS. 1 and 3-7 and utilizing, for example, the processes and/or algorithms described herein in relation to FIG. 9.

Figure 10:
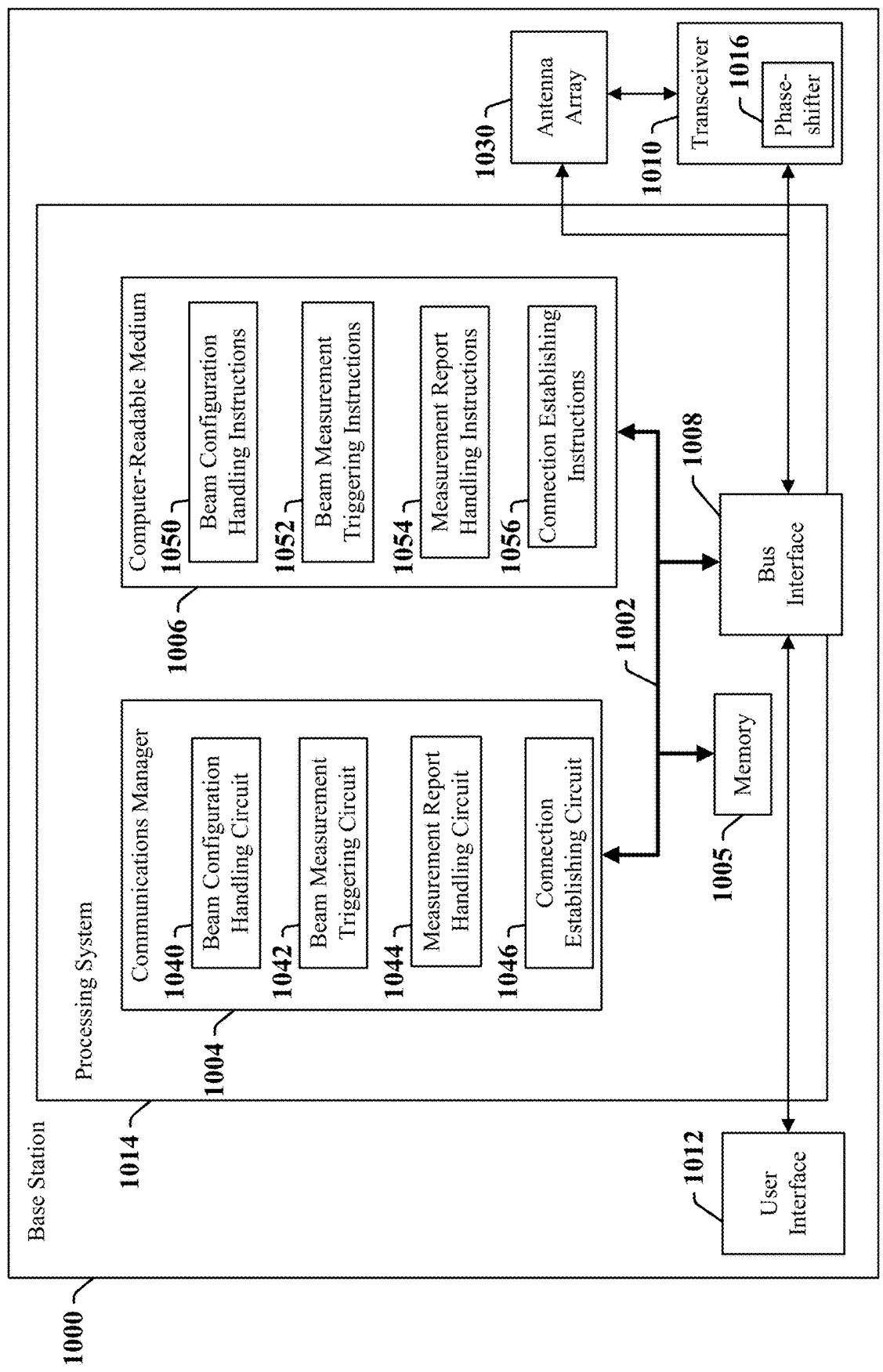
FIG. 10 is a conceptual diagram illustrating an example of a hardware implementation for an exemplary base station employing a processing system in accordance with aspects of the present disclosure.

FIG. 10 is a conceptual diagram illustrating an example of a hardware implementation for an exemplary base station 1000 employing a processing system 1014. In accordance with various aspects of the disclosure, an element, or any portion of an element, or any combination of elements may be implemented with a processing system 1014 that includes one or more processors 1004 (e.g., communications manager). For example, the base station 1000 may be a base station or gNB as illustrated in any one or more of FIGS. 1 and 3-7.

The processing system 1014 may be substantially the same as the processing system 814 illustrated in FIG. 8, including a bus interface 1008, a bus 1002, memory 1005, a processor 1004, and a computer-readable medium 1006. Furthermore, the base station 1000 may include a user interface 1012, a transceiver 1010 (including a phase-shifter 1016), and one or more antenna arrays 1030 substantially similar to those described above in FIG. 8. The processor 1004, as utilized in a base station 1000, may include the BS communications manager 199/399 and used to implement any one or more of the processes described below and illustrated in FIG. 11.

In some aspects of the disclosure, the processor 1004 (e.g., BS communications manager 199/399) may include beam configuration handling circuitry 1040 configured for various functions, including, for example, determining to modify an SSB beam configuration, sending, to the UE, a modified SSB beam configuration including at least one added SSB beam added to the SSB beam configuration, activating at least one added SSB associated with the at least one added SSB beam, deactivating at least one SSB associated with at least one excluded SSB beam, and sending, to the UE, the modified SSB beam configuration excluding the at least one excluded SSB beam. For example, the beam configuration handling circuitry 1040 may be configured to implement one or more of the functions described below in relation to FIG. 11, including, e.g., blocks 1102, 1104, 1106, 1114, and 1116. The processor 1004 may further include beam measurement triggering circuitry 1042 configured for various functions, including, for example, sending, to the UE based on a determination to modify the SSB beam configuration, a first message triggering the UE to measure a signal strength of SSB beams transmitted from the base station. For example, the beam measurement triggering circuitry 1042 may be configured to implement one or more of the functions described below in relation to FIG. 11, including, e.g., block 1108. The processor 1004 may further include measurement report handling circuitry 1044 configured for various functions, including, for example, receiving, from the UE, a second message including a report of the signal strength of the SSB beams. For example, the measurement report handling circuitry 1044 may be configured to implement one or more of the functions described below in relation to FIG. 11, including, e.g., block 1110. The processor 1004 may further include connection establishing circuitry 1046 configured for various functions, including, for example, sending, to the UE, a third message indicating at least an SSB beam of the SSB beams or a quasi-colocation (QCL) type to use based on the report and establishing a connection with the UE using an indicated SSB beam or QCL type. For example, the connection establishing circuitry 1046 may be configured to implement one or more of the functions described below in relation to FIG. 11, including, e.g., blocks 1112 and 1118.

In one or more examples, the computer-readable storage medium 1006 may include beam configuration handling instructions 1050 configured for various functions, including, for example, determining to modify an SSB beam configuration, sending, to the UE, a modified SSB beam configuration including at least one added SSB beam added to the SSB beam configuration, activating at least one added SSB associated with the at least one added SSB beam, deactivating at least one SSB associated with at least one excluded SSB beam, and sending, to the UE, the modified SSB beam configuration excluding the at least one excluded SSB beam. For example, the beam configuration handling instructions 1050 may be configured to implement one or more of the functions described below in relation to FIG. 11, including, e.g., blocks 1102, 1104, 1106, 1114, and 1116. The computer-readable storage medium 1006 may further include beam measurement triggering instructions 1052 configured for various functions, including, for example, sending, to the UE based on a determination to modify the SSB beam configuration, a first message triggering the UE to measure a signal strength of SSB beams transmitted from the base station. For example, the beam measurement triggering instructions 1052 may be configured to implement one or more of the functions described below in relation to FIG. 11, including, e.g., block 1108. The computer-readable storage medium 1006 may further include measurement report handling instructions 1054 configured for various functions, including, for example, receiving, from the UE, a second message including a report of the signal strength of the SSB beams. For example, the measurement report handling instructions 1054 may be configured to implement one or more of the functions described below in relation to FIG. 11, including, e.g., block 1110. The computer-readable storage medium 1006 may further include connection establishing circuitry 1046 configured for various functions, including, for example, sending, to the UE, a third message indicating at least an SSB beam of the SSB beams or a quasi-colocation (QCL) type to use based on the report and establishing a connection with the UE using an indicated SSB beam or QCL type. For example, the connection establishing instructions 1056 may be configured to implement one or more of the functions described below in relation to FIG. 11, including, e.g., blocks 1112 and 1118.

Figure 11:
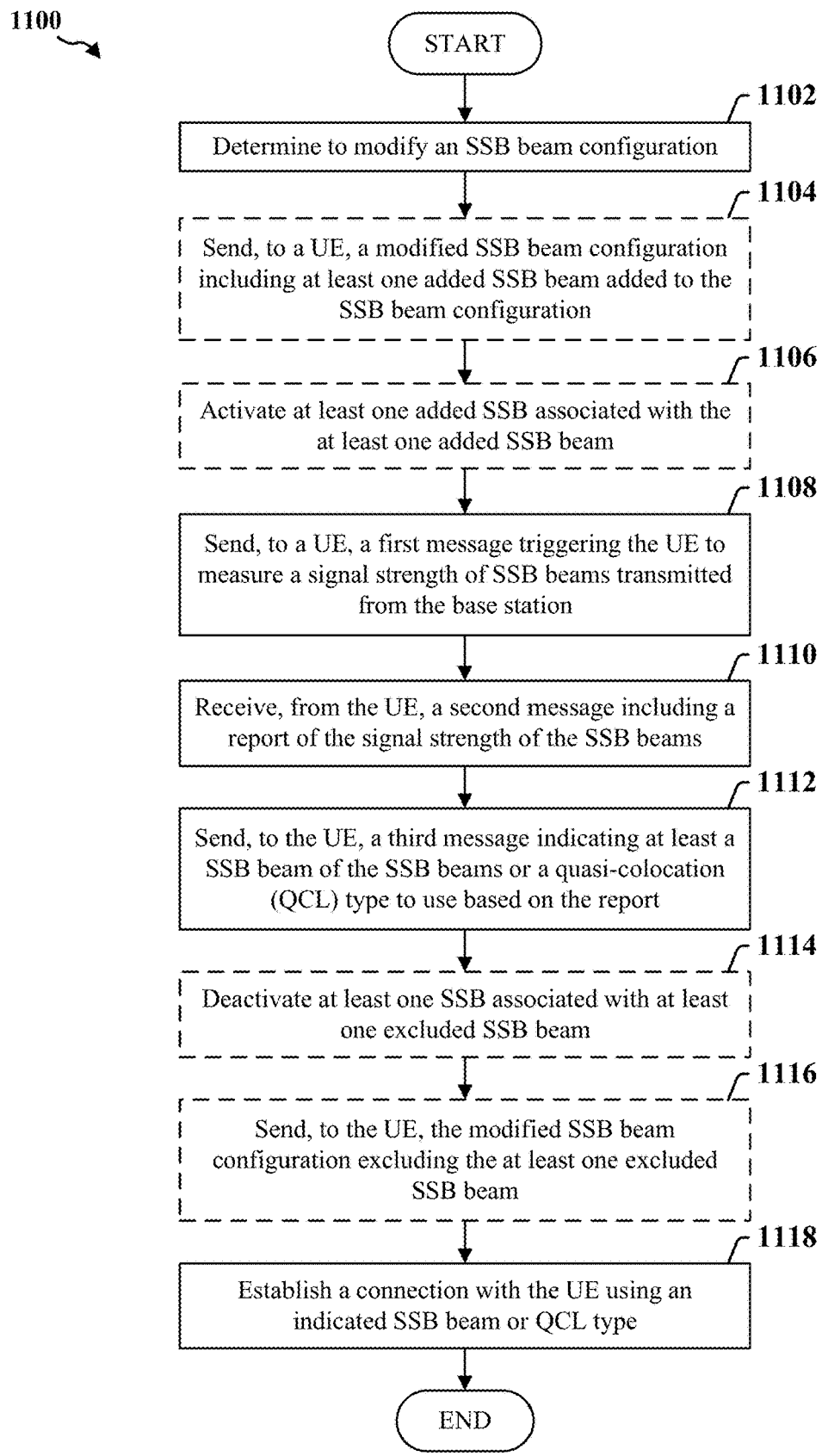
FIG. 11 is a flow chart illustrating an exemplary process for dynamically modifying a synchronization signal block (SSB) beam configuration at a base station in accordance with aspects of the present disclosure.

FIG. 11 is a flow chart illustrating an exemplary process 1100 for dynamically modifying a synchronization signal block (SSB) beam configuration at a base station (e.g., gNB) in accordance with aspects of the present disclosure. In some aspects, one or more SSB beams may be added to the SSB beam configuration. In other aspects, one or more SSB beams may be removed from the SSB beam configuration. As described below, some or all illustrated features may be omitted in a particular implementation within the scope of the present disclosure, and some illustrated features may not be required for implementation of all aspects. In some examples, the process 1100 may be carried out by the base station 1000 illustrated in FIG. 10, which may be a base station or gNB, as illustrated in any one or more of FIGS. 1 and 3-7. In some examples, the process 1100 may be carried out by any suitable apparatus or means for carrying out the functions or algorithm described below.

At block 1102, the base station may determine to modify an SSB beam configuration. In an aspect, the determination may include receiving a request from a user equipment (UE) to modify the SSB beam configuration. Alternatively, the determination may include autonomously determining to modify the SSB beam configuration based on a previously known signal strength measurement of the SSB beams.

In an aspect, if one or more SSB beams are being added to the SSB beam configuration, at block 1104, the base station may send, to the UE, a modified SSB beam configuration including at least one added SSB beam added to the SSB beam configuration. For example, the modified SSB beam configuration may be sent via a system information block (SIB) message. Moreover, at block 1106, the base station may activate at least one added SSB associated with the at least one added SSB beam.

At block 1108, the base station may send, to the UE based on a determination to modify the SSB beam configuration, a first message triggering the UE to measure a signal strength of SSB beams transmitted from the base station. In an aspect, if at least one SSB beam is being added to the SSB beam configuration, then the first message triggers the UE to measure the signal strength of the SSB beams including the at least one added SSB beam. For example, the first message triggers the UE to measure a reference signal receive power (RSRP) and/or a signal-to-interference-plus-noise ratio (SINR) of the SSB beams including the at least one added SSB beam. In another aspect, if at least one SSB beam is to be excluded/omitted from the SSB beam configuration, then the first message triggers the UE to measure the signal strength of the SSB beams excluding the at least one excluded/omitted SSB beam. For example, the first message triggers the UE to measure a reference signal receive power (RSRP) and/or signal-to-interference-plus-noise ratio (SINR) of the SSB beams excluding the at least one excluded/omitted SSB beam. At block 1110, the base station may receive, from the UE, a second message including a report of the signal strength of the SSB beams.

At block 1112, the base station may send, to the UE, a third message indicating at least an SSB beam of the SSB beams or a quasi-colocation (QCL) type to use based on the report. In an aspect, if at least one SSB beam is being added to the SSB beam configuration, then the third message indicates the at least one added SSB beam. In another aspect, if at least one SSB beam is to be excluded/omitted from the SSB beam configuration, then the third message indicates at least one remaining SSB beam remaining in the modified SSB beam configuration or a QCL type corresponding to the at least one remaining SSB beam. Additionally and/or alternatively, if the at least one SSB is to be excluded/omitted from the SSB beam configuration, then the third message indicates a substitute QCL type for the UE to use in place of a QCL type used for the at least one excluded SSB beam.

In an aspect, if at least one SSB beam is to be excluded/omitted from the SSB beam configuration, at block 1114, the base station may deactivate at least one SSB associated with the at least one excluded SSB beam. Moreover, at block 1116, the base station may send, to the UE, the modified SSB beam configuration excluding the at least one excluded SSB beam. For example, the modified SSB beam configuration may be sent via a system information block (SIB) message.

At block 1118, the base station may establish a connection with the UE using an indicated SSB beam or QCL type. For example, the base station may use the at least one added SSB beam added to the modified SSB beam configuration (as indicated in the third message) to establish the connection. Moreover, the base station may use the at least one remaining SSB beam remaining in the modified SSB beam configuration or the QCL type corresponding to the at least one remaining SSB beam (as alternatively indicated in the third message) to establish the connection. The base station may also use the substitute QCL type (as alternatively indicated in the third message) in place of a previously used QCL type (for an excluded SSB beam) to establish the connection.

In one configuration, the base station 1000 for wireless communication includes means for determining (e.g., beam configuration handling circuitry 1040, transceiver 1010, and/or antenna array 1030) to modify an SSB beam configuration, means for sending (e.g., beam configuration handling circuitry 1040, transceiver 1010, and/or antenna array 1030), to the UE, a modified SSB beam configuration including at least one added SSB beam added to the SSB beam configuration, means for activating (e.g., beam configuration handling circuitry 1040) at least one added SSB associated with the at least one added SSB beam, means for sending (e.g., beam measurement triggering circuitry 1042, transceiver 1010, and/or antenna array 1030), to the UE, a first message triggering the UE to measure a signal strength of SSB beams transmitted from the base station, means for receiving (e.g., measurement report handling circuitry 1044, transceiver 1010, and/or antenna array 1030), from the UE, a second message including a report of the signal strength of the SSB beams, means for sending (e.g., connection establishing circuitry 1046, transceiver 1010, and/or antenna array 1030), to the UE, a third message indicating at least an SSB beam of the SSB beams or a quasi-colocation (QCL) type to use based on the report, means for deactivating (e.g., beam configuration handling circuitry 1040) at least one SSB associated with the at least one excluded SSB beam, means for sending (e.g., beam configuration handling circuitry 1040, transceiver 1010, and/or antenna array 1030), to the UE, the modified SSB beam configuration excluding the at least one excluded SSB beam, and means for establishing (e.g., connection establishing circuitry 1046, transceiver 1010, and/or antenna array 1030) a connection with the UE using an indicated SSB beam or QCL type. In one aspect, the aforementioned means may be the processor 1004 shown in FIG. 10 configured to perform the functions recited by the aforementioned means. In another aspect, the aforementioned means may be a circuit or any apparatus configured to perform the functions recited by the aforementioned means.

Of course, in the above examples, the circuitry included in the processor 1004 is merely provided as an example, and other means for carrying out the described functions may be included within various aspects of the present disclosure, including but not limited to the instructions stored in the computer-readable storage medium 1006, or any other suitable apparatus or means described in any one of the FIGS. 1 and 3-7 and utilizing, for example, the processes and/or algorithms described herein in relation to FIG. 11.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-11 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-11 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The following provides an overview of aspects of the present disclosure:

Aspect 1: A method of dynamically modifying a synchronization signal block (SSB) beam configuration at a base station, comprising: sending, to a user equipment (UE) based on a determination to modify an SSB beam configuration, a first message triggering the UE to measure a signal strength of SSB beams transmitted from the base station; receiving, from the UE, a second message including a report of the signal strength of the SSB beams; sending, to the UE, a third message indicating at least an SSB beam of the SSB beams or a quasi-colocation (QCL) type to use based on the report; and establishing a connection with the UE using an indicated SSB beam or QCL type.

Aspect 2: The method of aspect 1, wherein the determination to modify the SSB beam configuration comprises: receiving a request from the UE to modify the SSB beam configuration; or autonomously determining to modify the SSB beam configuration based on a previously known signal strength measurement of the SSB beams.

Aspect 3: The method of aspect 1 or 2, further comprising: sending, to the UE, a modified SSB beam configuration including at least one added SSB beam added to the SSB beam configuration; and activating at least one added SSB associated with the at least one added SSB beam, wherein the first message triggers the UE to measure the signal strength of the SSB beams including the at least one added SSB beam, and wherein the third message indicates the at least one added SSB beam.

Aspect 4: The method of any one of aspects 1 through 3, wherein the sending of the modified SSB beam configuration comprises sending the modified SSB beam configuration via a system information block (SIB) message.

Aspect 5: The method of any one of aspects 1 through 3, wherein the sending of the first message triggering the UE to measure the signal strength of the SSB beams comprises: triggering the UE to measure a reference signal receive power (RSRP) of the SSB beams including the at least one added SSB beam; or triggering the UE to measure a signal-to-interference-plus-noise ratio (SINR) of the SSB beams including the at least one added SSB beam.

Aspect 6: The method of aspect 1 or 2, wherein the sending of the first message triggering the UE to measure the signal strength of the SSB beams comprises: triggering the UE to measure a reference signal receive power (RSRP) of the SSB beams excluding at least one excluded SSB beam to be omitted from a modified SSB beam configuration; or triggering the UE to measure a signal-to-interference-plus-noise ratio (SINR) of the SSB beams excluding the at least one excluded SSB beam to be omitted from the modified SSB beam configuration.

Aspect 7: The method of any one of aspects 1, 2, or 6, wherein the third message indicates at least one remaining SSB beam remaining in the modified SSB beam configuration or a QCL type corresponding to the at least one remaining SSB beam.

Aspect 8: The method of any one of aspects 1, 2, 6, or 7, further comprising: deactivating at least one SSB associated with the at least one excluded SSB beam; and sending, to the UE, the modified SSB beam configuration excluding the at least one excluded SSB beam.

Aspect 9: The method of any one of aspects 1, 2, 6, 7, or 8, wherein the sending of the modified SSB beam configuration comprises sending the modified SSB beam configuration via a system information block (SIB) message.

Aspect 10: The method of any one of aspects 1, 2, 6, 7, 8, or 9, wherein the third message indicates a substitute QCL type for the UE to use in place of a QCL type used for the at least one excluded SSB beam.

Aspect 11: A base station comprising at least one processor, and a memory coupled to the at least one processor, the at least one processor and the memory configured to perform a method of any one of aspects 1 through 10.

Aspect 12: A base station comprising at least one means for performing a method of any one of aspects 1 through 10.

Aspect 13: A non-transitory computer-readable medium storing code at a base station, the code comprising instructions executable by a processor to perform a method of any one of aspects 1 through 10.

Aspect 14: A method of dynamically modifying a synchronization signal block (SSB) beam configuration at a user equipment (UE), comprising: receiving, from a base station, a first message triggering the UE to measure a signal strength of SSB beams transmitted from the base station; sending, to the base station, a second message including a report of the signal strength of the SSB beams; receiving, from the base station, a third message indicating at least an SSB beam of the SSB beams or a quasi-colocation (QCL) type to use based on the report; and establishing a connection with the base station using an indicated SSB beam or QCL type.

Aspect 15: The method of aspect 14, further comprising sending a request to the base station to modify an SSB beam configuration.

Aspect 16: The method of aspect 14 or 15, further comprising: receiving, from the base station, a modified SSB beam configuration including at least one added SSB beam, wherein the first message triggers the UE to measure the signal strength of the SSB beams including the at least one added SSB beam, and wherein the third message indicates the at least one added SSB beam.

Aspect 17: The method of any one of aspects 14 through 16, wherein the receiving of the modified SSB beam configuration comprises receiving the modified SSB beam configuration via a system information block (SIB) message.

Aspect 18: The method of any one of aspects 14 through 17, wherein the receiving of the first message triggering the UE to measure the signal strength of the SSB beams comprises: triggering the UE to measure a reference signal receive power (RSRP) of the SSB beams including the at least one added SSB beam; or triggering the UE to measure a signal-to-interference-plus-noise ratio (SINR) of the SSB beams including the at least one added SSB beam.

Aspect 19: The method of aspect 14 or 15, wherein the receiving of the first message triggering the UE to measure the signal strength of the SSB beams comprises: triggering the UE to measure a reference signal receive power (RSRP) of the SSB beams excluding at least one excluded SSB beam to be omitted from a modified SSB beam configuration; or triggering the UE to measure a signal-to-interference-plus-noise ratio (SINR) of the SSB beams excluding the at least one excluded SSB beam to be omitted from the modified SSB beam configuration.

Aspect 20: The method of any one of aspects 14, 15, or 19, wherein the third message indicates at least one remaining SSB beam remaining in the modified SSB beam configuration or a QCL type corresponding to the at least one remaining SSB beam.

Aspect 21: The method of any one of aspects 14, 15, 19, or 20, further comprising: receiving, from the base station, the modified SSB beam configuration excluding the at least one excluded SSB beam.

Aspect 22: The method of any one of aspects 14, 15, 19, 20, or 21, wherein the receiving of the modified SSB beam configuration comprises receiving the modified SSB beam configuration via a system information block (SIB) message.

Aspect 23: The method of any one of aspects 14, 15, 19, 20, 21, or 22, wherein the third message indicates a substitute QCL type for the UE to use in place of a QCL type used for the at least one excluded SSB beam.

Aspect 24: A user equipment (UE) comprising at least one processor, and a memory coupled to the at least one processor, the at least one processor and the memory configured to perform a method of any one of aspects 14 through 23.

Aspect 25: A user equipment (UE) comprising at least one means for performing a method of any one of aspects 14 through 23.

Aspect 26: A non-transitory computer-readable medium storing code at a user equipment (UE), the code comprising instructions executable by a processor to perform a method of any one of aspects 14 through 23.

Aspect 27: A method of dynamically modifying a synchronization signal block (SSB) beam configuration at a base station, comprising: sending, to a user equipment (UE), a modified SSB beam configuration including at least one added SSB beam added to an SSB beam configuration; activating at least one added SSB associated with the at least one added SSB beam; sending, to the UE based on a determination to modify the SSB beam configuration, a first message triggering the UE to measure a signal strength of SSB beams transmitted from the base station including the at least one added SSB beam; receiving, from the UE, a second message including a report of the signal strength of the SSB beams; sending, to the UE, a third message indicating the at least one added SSB beam to use based on the report; and establishing a connection with the UE using an indicated SSB beam.

Aspect 28: The method of aspect 27, wherein the determination to modify the SSB beam configuration comprises: receiving a request from the UE to modify the SSB beam configuration; or autonomously determining to modify the SSB beam configuration based on a previously known signal strength measurement of the SSB beams.

Aspect 29: The method of aspect 27 or 28, wherein the sending of the modified SSB beam configuration comprises sending the modified SSB beam configuration via a system information block (SIB) message.

Aspect 30: The method of any one of aspects 27 through 29, wherein the sending of the first message triggering the UE to measure the signal strength of the SSB beams comprises: triggering the UE to measure a reference signal receive power (RSRP) of the SSB beams including the at least one added SSB beam; or triggering the UE to measure a signal-to-interference-plus-noise ratio (SINR) of the SSB beams including the at least one added SSB beam.

Aspect 31: A base station comprising at least one processor, and a memory coupled to the at least one processor, the at least one processor and the memory configured to perform a method of any one of aspects 27 through 30.

Aspect 32: A base station comprising at least one means for performing a method of any one of aspects 27 through 30.

Aspect 33: A non-transitory computer-readable medium storing code at a base station, the code comprising instructions executable by a processor to perform a method of any one of aspects 27 through 30.

Aspect 34: A method of dynamically modifying a synchronization signal block (SSB) beam configuration at a user equipment (UE), comprising: receiving, from a base station, a modified SSB beam configuration including at least one added SSB beam; receiving, from the base station, a first message triggering the UE to measure a signal strength of SSB beams transmitted from the base station including the at least one added SSB beam; sending, to the base station, a second message including a report of the signal strength of the SSB beams; receiving, from the base station, a third message indicating the at least one added SSB beam to use based on the report; and establishing a connection with the base station using an indicated SSB beam.

Aspect 35: The method of aspect 34, further comprising: sending a request to the base station to modify an SSB beam configuration.

Aspect 36: The method of aspect 34 or 35, wherein the receiving of the modified SSB beam configuration comprises receiving the modified SSB beam configuration via a system information block (SIB) message.

Aspect 37: The method of any one of aspects 34 through 36, wherein the receiving of the first message triggering the UE to measure the signal strength of the SSB beams comprises: triggering the UE to measure a reference signal receive power (RSRP) of the SSB beams including the at least one added SSB beam; or triggering the UE to measure a signal-to-interference-plus-noise ratio (SINR) of the SSB beams including the at least one added SSB beam.

Aspect 38: A user equipment (UE) comprising at least one processor, and a memory coupled to the at least one processor, the at least one processor and the memory configured to perform a method of any one of aspects 34 through 37.

Aspect 39: A user equipment (UE) comprising at least one means for performing a method of any one of aspects 34 through 37.

Aspect 40: A non-transitory computer-readable medium storing code at a user equipment (UE), the code comprising instructions executable by a processor to perform a method of any one of aspects 34 through 37.

Aspect 41: A method of dynamically modifying a synchronization signal block (SSB) beam configuration at a base station, comprising: sending, to a user equipment (UE) based on a determination to modify an SSB beam configuration, a first message triggering the UE to measure a signal strength of SSB beams transmitted from the base station excluding at least one excluded SSB beam to be omitted from a modified SSB beam configuration; receiving, from the UE, a second message including a report of the signal strength of the SSB beams; sending, to the UE based on the report, a third message indicating at least one remaining SSB beam remaining in the modified SSB beam configuration or a quasi-colocation (QCL) type corresponding to the at least one remaining SSB beam; deactivating at least one SSB associated with the at least one excluded SSB beam; sending, to the UE, the modified SSB beam configuration excluding the at least one excluded SSB beam; and establishing a connection with the UE using an indicated SSB beam or QCL type.

Aspect 42: The method of aspect 42, wherein the determination to modify the SSB beam configuration comprises: receiving a request from the UE to modify the SSB beam configuration; or autonomously determining to modify the SSB beam configuration based on a previously known signal strength measurement of the SSB beams.

Aspect 43: The method of aspect 41 or 42, wherein the sending of the first message triggering the UE to measure the signal strength of the SSB beams comprises: triggering the UE to measure a reference signal receive power (RSRP) of the SSB beams excluding the at least one excluded SSB beam to be omitted from the modified SSB beam configuration; or triggering the UE to measure a signal-to-interference-plus-noise ratio (SINR) of the SSB beams excluding the at least one excluded SSB beam to be omitted from the modified SSB beam configuration.

Aspect 44: The method of any one of aspects 41 through 43, wherein the sending of the modified SSB beam configuration comprises sending the modified SSB beam configuration via a system information block (SIB) message.

Aspect 45: The method of any one of aspects 41 through 44, wherein the third message indicates a substitute QCL type for the UE to use in place of a QCL type used for the at least one excluded SSB beam.

Aspect 46: A base station comprising at least one processor, and a memory coupled to the at least one processor, the at least one processor and the memory configured to perform a method of any one of aspects 41 through 45.

Aspect 47: A base station comprising at least one means for performing a method of any one of aspects 41 through 45.

Aspect 48: A non-transitory computer-readable medium storing code at a base station, the code comprising instructions executable by a processor to perform a method of any one of aspects 41 through 45.

Aspect 49: A method of dynamically modifying a synchronization signal block (SSB) beam configuration at a user equipment (UE), comprising: receiving, from a base station, a first message triggering the UE to measure a signal strength of SSB beams transmitted from the base station excluding at least one excluded SSB beam to be omitted from a modified SSB beam configuration; sending, to the base station, a second message including a report of the signal strength of the SSB beams; receiving, from the base station based on the report, a third message indicating at least one remaining SSB beam remaining in the modified SSB beam configuration or a quasi-colocation (QCL) type corresponding to the at least one remaining SSB beam; receiving, from the base station, the modified SSB beam configuration excluding the at least one excluded SSB beam; and establishing a connection with the base station using an indicated SSB beam or QCL type.

Aspect 50: The method of aspect 49, further comprising sending a request to the base station to modify an SSB beam configuration.

Aspect 51: The method of aspect 49 or 50, wherein the receiving of the first message triggering the UE to measure the signal strength of the SSB beams comprises: triggering the UE to measure a reference signal receive power (RSRP) of the SSB beams excluding the at least one excluded SSB beam to be omitted from the modified SSB beam configuration; or triggering the UE to measure a signal-to-interference-plus-noise ratio (SINR) of the SSB beams excluding the at least one excluded SSB beam to be omitted from the modified SSB beam configuration.

Aspect 52: The method of any one of aspects 49 through 51, wherein the receiving of the modified SSB beam configuration comprises receiving the modified SSB beam configuration via a system information block (SIB) message.

Aspect 53: The method of any one of aspects 49 through 52, wherein the third message indicates a substitute QCL type for the UE to use in place of a QCL type used for the at least one excluded SSB beam.

Aspect 54: A user equipment (UE) comprising at least one processor, and a memory coupled to the at least one processor, the at least one processor and the memory configured to perform a method of any one of aspects 49 through 53.

Aspect 55: A user equipment (UE) comprising at least one means for performing a method of any one of aspects 49 through 53.

Aspect 56: A non-transitory computer-readable medium storing code at a user equipment (UE), the code comprising instructions executable by a processor to perform a method of any one of aspects 49 through 53.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of dynamically modifying a synchronization signal block (SSB) beam configuration at a network node, comprising:
    sending, based on a determination to modify an SSB beam configuration, a first message triggering signal strength measurements of a plurality of SSB beams transmitted from the network node that are active or will remain active in a modified SSB beam configuration;
    receiving, a second message including a report of the signal strength measurements of the plurality of SSB beams that are active or will remain active in the modified SSB beam configuration;
    sending, for a user equipment (UE), a third message indicating at least one of an SSB beam of the plurality of SSB beams that are active or will remain active in the modified SSB beam configuration or a quasi-colocation (QCL) type to use based on the report; and
    establishing a connection with the UE using the at least one of the SSB beam or the QCL type.

2. The method of claim 1, wherein the determination to modify the SSB beam configuration comprises at least one of:
    receiving a request to modify the SSB beam configuration; or
    autonomously determining to modify the SSB beam configuration based on previously known signal strength measurements of the plurality of SSB beams that are active or will remain active in the modified SSB beam configuration.

3. The method of claim 1, further comprising:
sending, for the UE, the modified SSB beam configuration including at least one added SSB beam added to the SSB beam configuration; and
activating at least one added SSB associated with the at least one added SSB beam,
wherein the first message triggers the signal strength measurements of the plurality of SSB beams including the at least one added SSB beam, and
wherein the third message indicates the at least one added SSB beam.

4. The method of claim 3, wherein the sending the modified SSB beam configuration comprises sending the modified SSB beam configuration via a system information block (SIB) message.

5. The method of claim 3, wherein the sending the first message triggering the signal strength measurements of the plurality of SSB beams that are active or will remain active in the modified SSB beam configuration comprises:
triggering reference signal receive power (RSRP) measurements of the plurality of SSB beams including the at least one added SSB beam; or
triggering signal-to-interference-plus-noise ratio (SINR) measurements of the plurality of SSB beams including the at least one added SSB beam.

6. The method of claim 1, wherein the sending the first message triggering the signal strength measurements of the plurality of SSB beams that are active or will remain active in the modified SSB beam configuration comprises:
triggering reference signal receive power (RSRP) measurements of the plurality of SSB beams excluding at least one excluded SSB beam to be omitted from the modified SSB beam configuration; or
triggering signal-to-interference-plus-noise ratio (SINR) measurements of the plurality of SSB beams excluding the at least one excluded SSB beam to be omitted from the modified SSB beam configuration.

7. The method of claim 6, wherein the third message indicates at least one remaining SSB beam remaining in the modified SSB beam configuration or a QCL type corresponding to the at least one remaining SSB beam.

8. The method of claim 7, further comprising:
deactivating at least one SSB associated with the at least one excluded SSB beam; and
sending, for the UE, the modified SSB beam configuration excluding the at least one excluded SSB beam.

9. The method of claim 8, wherein the sending the modified SSB beam configuration comprises sending the modified SSB beam configuration via a system information block (SIB) message.

10. The method of claim 6, wherein the third message indicates a substitute QCL type to use in place of a QCL type used for the at least one excluded SSB beam.

11. An apparatus for wireless communication at a network node for dynamically modifying a synchronization signal block (SSB) beam configuration, comprising:
at least one processor; and
a memory coupled to the at least one processor, the at least one processor configured to:
send, based on a determination to modify an SSB beam configuration, a first message triggering signal strength measurements of a plurality of SSB beams transmitted from the network node that are active or will remain active in a modified SSB beam configuration,
receive, a second message including a report of the signal strength measurements of the plurality of SSB beams that are active or will remain active in the modified SSB beam configuration,
send, for a user equipment (UE), a third message indicating at least one of an SSB beam of the plurality of SSB beams that are active or will remain active in the modified SSB beam configuration or a quasi-colocation (QCL) type to use based on the report, and
establish a connection with the UE using the at least one of the SSB beam or the QCL type.

12. The apparatus of claim 11, further comprising:
a transceiver, wherein the at least one processor is further configured to:
send, for the UE via the transceiver, the modified SSB beam configuration including at least one added SSB beam added to the SSB beam configuration, and
activate at least one added SSB associated with the at least one added SSB beam,
wherein the first message triggers the signal strength measurements of the plurality of SSB beams including the at least one added SSB beam, and
wherein the third message indicates the at least one added SSB beam.

13. The apparatus of claim 12, wherein in configuring to send the first message triggering the signal strength measurements of the plurality of SSB beams that are active or will remain active in the modified SSB beam configuration, the at least one processor is further configured to:
trigger reference signal receive power (RSRP) measurements of the plurality of SSB beams including the at least one added SSB beam; or
trigger signal-to-interference-plus-noise ratio (SINR) measurements of the plurality of SSB beams including the at least one added SSB beam.

14. The apparatus of claim 11, wherein in configuring to send the first message triggering the signal strength measurements of the plurality of SSB beams that are active or will remain active in the modified SSB beam configuration, the at least one processor is further configured to:
trigger reference signal receive power (RSRP) measurements of the plurality of SSB beams excluding at least one excluded SSB beam to be omitted from the modified SSB beam configuration; or
trigger signal-to-interference-plus-noise ratio (SINR) measurements of the plurality of SSB beams excluding the at least one excluded SSB beam to be omitted from the modified SSB beam configuration,
wherein the third message indicates:
at least one remaining SSB beam remaining in the modified SSB beam configuration or a QCL type corresponding to the at least one remaining SSB beam, or
a substitute QCL type to use in place of a QCL type used for the at least one excluded SSB beam.

15. The apparatus of claim 14, further comprising:
a transceiver, wherein the at least one processor is further configured to:
deactivate at least one SSB associated with the at least one excluded SSB beam; and
send, for the UE via the transceiver, the modified SSB beam configuration excluding the at least one excluded SSB beam.

16. A method of dynamically modifying a synchronization signal block (SSB) beam configuration at a user equipment (UE), comprising:
receiving, from a network node, a first message triggering signal strength measurements of a plurality of SSB beams received from the network node that are active or will remain active in a modified SSB beam configuration;

sending, to the network node, a second message including a report of the signal strength measurements of the plurality of SSB beams that are active or will remain active in the modified SSB beam configuration;

receiving, from the network node, a third message indicating at least one of an SSB beam of the plurality of SSB beams that are active or will remain active in the modified SSB beam configuration or a quasi-colocation (QCL) type to use based on the report; and establishing a connection with the network node using the at least one of the SSB beam or the QCL type.

17. The method of claim 16, further comprising:
sending a request to the network node to modify an SSB beam configuration.

18. The method of claim 16, further comprising:
receiving, from the network node, the modified SSB beam configuration including at least one added SSB beam,
wherein the first message triggers the signal strength measurements of the plurality of SSB beams including the at least one added SSB beam, and
wherein the third message indicates the at least one added SSB beam.

19. The method of claim 18, wherein the receiving the modified SSB beam configuration comprises receiving the modified SSB beam configuration via a system information block (SIB) message.

20. The method of claim 18, wherein the receiving the first message triggering the signal strength measurements of the plurality of SSB beams that are active or will remain active in the modified SSB beam configuration comprises:
triggering reference signal receive power (RSRP) measurements of the plurality of SSB beams including the at least one added SSB beam; or
triggering signal-to-interference-plus-noise ratio (SINR) measurements of the plurality of SSB beams including the at least one added SSB beam.

21. The method of claim 16, wherein the receiving the first message triggering the signal strength measurements of the plurality of SSB beams that are active or will remain active in the modified SSB beam configuration comprises:
triggering reference signal receive power (RSRP) measurements of the plurality of SSB beams excluding at least one excluded SSB beam to be omitted from the modified SSB beam configuration; or
triggering signal-to-interference-plus-noise ratio (SINR) measurements of the plurality of SSB beams excluding the at least one excluded SSB beam to be omitted from the modified SSB beam configuration.

22. The method of claim 21, wherein the third message indicates at least one remaining SSB beam remaining in the modified SSB beam configuration or a QCL type corresponding to the at least one remaining SSB beam.

23. The method of claim 22, further comprising:
receiving, from the network node, the modified SSB beam configuration excluding the at least one excluded SSB beam.

24. The method of claim 23, wherein the receiving the modified SSB beam configuration comprises receiving the modified SSB beam configuration via a system information block (SIB) message.

25. The method of claim 21, wherein the third message indicates a substitute QCL type to use in place of a QCL type used for the at least one excluded SSB beam.

26. An apparatus for wireless communication at a user equipment (UE) for dynamically modifying a synchronization signal block (SSB) beam configuration, comprising:
at least one processor; and
a memory coupled to the at least one processor, the at least one processor configured to:
receive, from a network node, a first message triggering signal strength measurements of a plurality of SSB beams received from the network node that are active or will remain active in a modified SSB beam configuration;
send, to the network node, a second message including a report of the signal strength measurements of the plurality of SSB beams that are active or will remain active in the modified SSB beam configuration;
receive, from the network node, a third message indicating at least one of an SSB beam of the plurality of SSB beams that are active or will remain active in the modified SSB beam configuration or a quasi-colocation (QCL) type to use based on the report; and
establish a connection with the network node using the at least one of the SSB beam or the QCL type.

27. The apparatus of claim 26, further comprising:
a transceiver, wherein the at least one processor is further configured to:
receive, from the network node, the modified SSB beam configuration including at least one added SSB beam,
wherein the first message triggers signal strength measurements of the plurality of SSB beams including the at least one added SSB beam, and
wherein the third message indicates the at least one added SSB beam.

28. The apparatus of claim 27, wherein in configuring to receive the first message triggering the signal strength measurements of the plurality of SSB beams that are active or will remain active in the modified SSB beam configuration, the at least one processor is further configured to:
trigger reference signal receive power (RSRP) measurements of the plurality of SSB beams including the at least one added SSB beam; or
trigger signal-to-interference-plus-noise ratio (SINR) measurements of the plurality of SSB beams including the at least one added SSB beam.

29. The apparatus of claim 26, wherein in configuring to receive the first message triggering the signal strength measurements of the plurality of SSB beams that are active or will remain active in the modified SSB beam configuration, the at least one processor is further configured to:
trigger reference signal receive power (RSRP) measurements of the plurality of SSB beams excluding at least one excluded SSB beam to be omitted from the modified SSB beam configuration; or
trigger signal-to-interference-plus-noise ratio (SINR) measurements of the plurality of SSB beams excluding the at least one excluded SSB beam to be omitted from the modified SSB beam configuration,
wherein the third message indicates:
at least one remaining SSB beam remaining in the modified SSB beam configuration or a QCL type corresponding to the at least one remaining SSB beam; or
a substitute QCL type to use in place of a QCL type used for the at least one excluded SSB beam.

30. The apparatus of claim 29, further comprising:
a transceiver, wherein the at least one processor is further configured to:

receive, from the network node via the transceiver, the modified SSB beam configuration excluding the at least one excluded SSB beam.

31. A non-transitory computer-readable medium storing code at a network node, the code comprising instructions executable by a processor to:
send, based on a determination to modify a synchronization signal block (SSB) beam configuration, a first message triggering signal strength measurements of a plurality of SSB beams transmitted from the network node that are active or will remain active in a modified SSB beam configuration;
receive, a second message including a report of the signal strength measurements of the plurality of SSB beams that are active or will remain active in the modified SSB beam configuration;
send, for a user equipment (UE), a third message indicating at least one of an SSB beam of the plurality of SSB beams that are active or will remain active in the modified SSB beam configuration or a quasi-colocation (QCL) type to use based on the report; and
establish a connection with the UE using the at least one of the SSB beam or the QCL type.

32. The non-transitory computer-readable medium of claim 31, wherein the code further comprises instructions executable by the processor to:
send, for the UE, the modified SSB beam configuration including at least one added SSB beam added to the SSB beam configuration; and
activate at least one added SSB associated with the at least one added SSB beam,
wherein the first message triggers the signal strength measurements of the plurality of SSB beams including the at least one added SSB beam, and
wherein the third message indicates the at least one added SSB beam.

33. The non-transitory computer-readable medium of claim 32, wherein the code further comprises instructions executable by the processor to:
trigger reference signal receive power (RSRP) measurements of the plurality of SSB beams including the at least one added SSB beam; or
trigger signal-to-interference-plus-noise ratio (SINR) measurements of the plurality of SSB beams including the at least one added SSB beam.

34. The non-transitory computer-readable medium of claim 31, wherein the code further comprises instructions executable by the processor to:
trigger reference signal receive power (RSRP) measurements of the plurality of SSB beams excluding at least one excluded SSB beam to be omitted from the modified SSB beam configuration; or
trigger signal-to-interference-plus-noise ratio (SINR) measurements of the plurality of SSB beams excluding the at least one excluded SSB beam to be omitted from the modified SSB beam configuration,
wherein the third message indicates:
at least one remaining SSB beam remaining in the modified SSB beam configuration or a QCL type corresponding to the at least one remaining SSB beam, or
a substitute QCL type to use in place of a QCL type used for the at least one excluded SSB beam.

35. The non-transitory computer-readable medium of claim 34, wherein the code further comprises instructions executable by the processor to:

deactivate at least one SSB associated with the at least one excluded SSB beam; and
send, for the UE, the modified SSB beam configuration excluding the at least one excluded SSB beam.

36. A non-transitory computer-readable medium storing code at an apparatus for wireless communication, the code comprising instructions executable by a processor to:
receive, from a network node, a first message triggering signal strength measurements of a plurality of synchronization signal block (SSB) beams received from the network node that are active or will remain active in a modified SSB beam configuration;
send, to the network node, a second message including a report of the signal strength measurements of the plurality of SSB beams that are active or will remain active in the modified SSB beam configuration;
receive, from the network node, a third message indicating at least one of an SSB beam of the plurality of SSB beams that are active or will remain active in the modified SSB beam configuration or a quasi-colocation (QCL) type to use based on the report; and
establish a connection with the network node using the at least one of the SSB beam or the QCL type.

37. The non-transitory computer-readable medium of claim 36, wherein the code further comprises instructions executable by the processor to:
receive, from the network node, the modified SSB beam configuration including at least one added SSB beam,
wherein the first message triggers signal strength measurements of the plurality of SSB beams including the at least one added SSB beam, and
wherein the third message indicates the at least one added SSB beam.

38. The non-transitory computer-readable medium of claim 37, wherein the code further comprises instructions executable by the processor to:
trigger reference signal receive power (RSRP) measurements of the plurality of SSB beams including the at least one added SSB beam; or
trigger signal-to-interference-plus-noise ratio (SINR) measurements of the plurality of SSB beams including the at least one added SSB beam.

39. The non-transitory computer-readable medium of claim 36, wherein the code further comprises instructions executable by the processor to:
trigger reference signal receive power (RSRP) measurements of the plurality of SSB beams excluding at least one excluded SSB beam to be omitted from the modified SSB beam configuration; or
trigger signal-to-interference-plus-noise ratio (SINR) measurements of the plurality of SSB beams excluding the at least one excluded SSB beam to be omitted from the modified SSB beam configuration,
wherein the third message indicates:
at least one remaining SSB beam remaining in the modified SSB beam configuration or a QCL type corresponding to the at least one remaining SSB beam, or
a substitute QCL type to use in place of a QCL type used for the at least one excluded SSB beam.

40. The non-transitory computer-readable medium of claim 39, wherein the code further comprises instructions executable by the processor to:
receive, from the network node, the modified SSB beam configuration excluding the at least one excluded SSB beam.

* * * * *